US011551663B1

(12) United States Patent
Bissell et al.

(10) Patent No.: US 11,551,663 B1
(45) Date of Patent: Jan. 10, 2023

(54) DYNAMIC SYSTEM RESPONSE CONFIGURATION

(71) Applicant: Amazon Technologies, Inc., Seattle, WA (US)

(72) Inventors: Anthony Bissell, Somerville, MA (US); Janet Slifka, Cambridge, MA (US)

(73) Assignee: Amazon Technologies, Inc., Seattle, WA (US)

(*) Notice: Subject to any disclaimer, the term of this patent is extended or adjusted under 35 U.S.C. 154(b) by 147 days.

(21) Appl. No.: 17/117,966

(22) Filed: Dec. 10, 2020

(51) Int. Cl.
*G10L 13/047* (2013.01)
*G10L 15/22* (2006.01)
*G10L 15/18* (2013.01)
*G10L 13/08* (2013.01)

(52) U.S. Cl.
CPC .......... *G10L 13/047* (2013.01); *G10L 13/086* (2013.01); *G10L 15/18* (2013.01); *G10L 15/22* (2013.01)

(58) Field of Classification Search
CPC ......... G10L 15/18; G10L 15/22; G10L 15/26; G10L 13/047; G10L 13/086
USPC ........................................................ 704/270
See application file for complete search history.

(56) References Cited

U.S. PATENT DOCUMENTS

| | | | | |
|---|---|---|---|---|
| 10,467,552 B2* | 11/2019 | Ahmad | ................... | G06N 20/00 |
| 10,796,563 B1* | 10/2020 | Bell | ..................... | G10L 15/22 |
| 10,992,795 B2* | 4/2021 | Coffman | ........... | H04M 1/72442 |
| 11,158,308 B1* | 10/2021 | Bissell | ................... | G10L 15/22 |
| 11,170,776 B1* | 11/2021 | Whalin | ................... | G10L 15/30 |
| 11,211,056 B1* | 12/2021 | Bissell | ................... | G10L 15/30 |
| 11,283,916 B2* | 3/2022 | Coffman | ................ | C08G 61/08 |
| 11,294,898 B2* | 4/2022 | Ahmad | ............... | H04L 41/0853 |
| 11,315,552 B1* | 4/2022 | George | ................ | G06F 40/279 |
| 11,316,966 B2* | 4/2022 | Coffman | ................ | E04F 13/10 |

* cited by examiner

*Primary Examiner* — Susan I McFadden
(74) *Attorney, Agent, or Firm* — Pierce Atwood LLP

(57) ABSTRACT

A natural language processing system may use system response configuration data to determine customized output data forms when outputting data for a user. The system response configuration data may represent various output attributes the system may use when creating output data. The system may have a certain number of existing profiles where a profile is associated with certain settings for the system response configuration data/attributes. The system may also use various data such as context data, sentiment data, or the like to customize system response configuration data during a dialog. Other components, such as natural language generation (NLG), text-to-speech (TTS), or the like, may use the customized system response configuration data to determine the form, timing, etc. of output data to be presented to a user.

20 Claims, 18 Drawing Sheets

FIG. 4A

System Response Profile Data Storage
255

System Response Configuration Data
256

| Profile | Profile ID | Verbosity | Friendliness | Formality | Politeness | Happiness | Affirmative |
|---|---|---|---|---|---|---|---|
| Training | ABD234 | 0.7 | 1.0 | 0.5 | 0.7 | 0.7 | 1.0 |
| Working | 123GFD | 0.3 | 0.5 | 0.8 | 0.5 | 0.6 | 0.3 |
| Casual | YGH456 | 0.5 | 0.7 | 0.3 | 0.6 | 0.5 | 0.5 |
| Party | 986YUG | 0.6 | 0.9 | 0.2 | 0.6 | 0.9 | 0.5 |
| Instructor | 5HB2N1 | 0.8 | 0.4 | 0.6 | 0.8 | 0.4 | 0.7 |
| ... | | | | | | | |

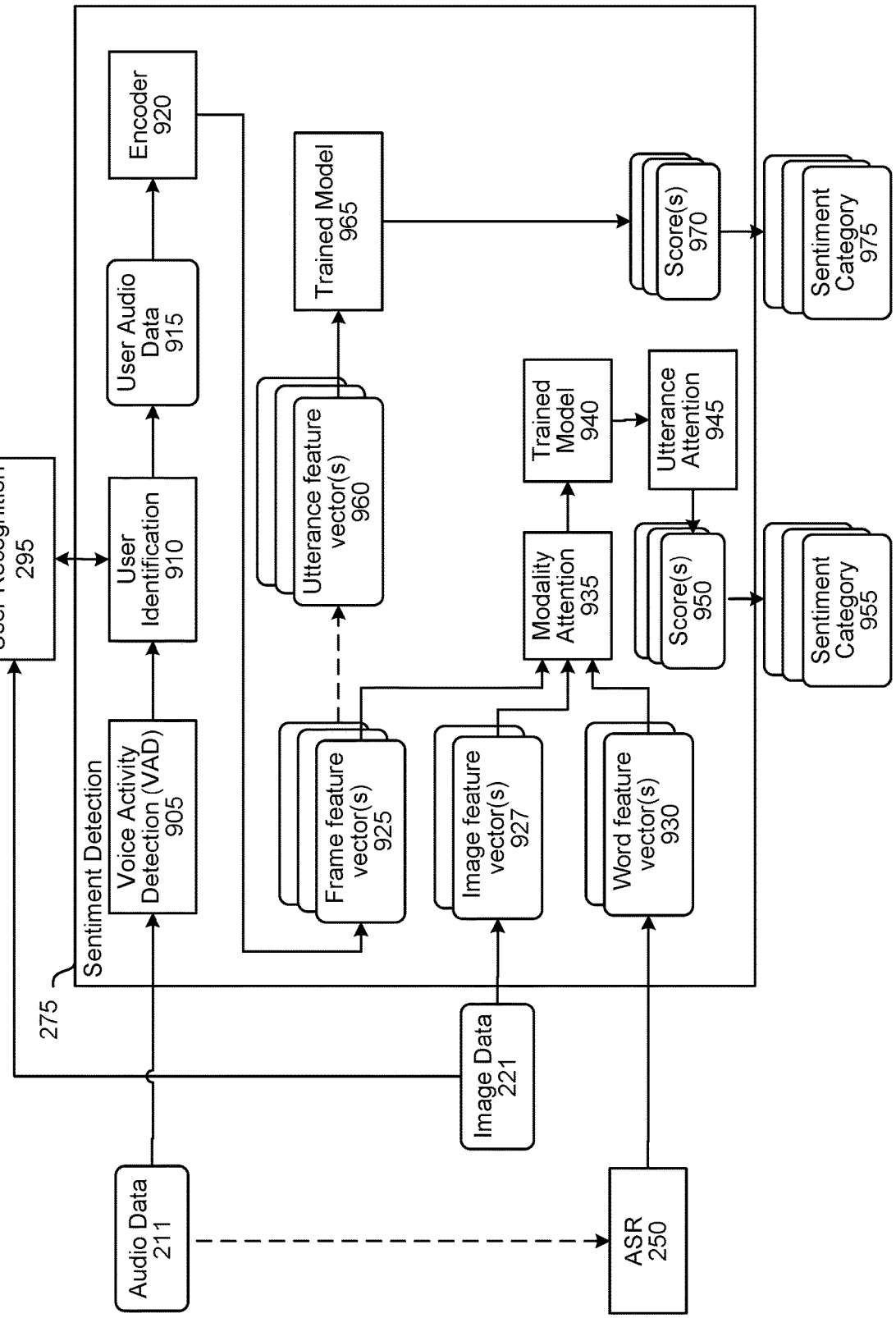

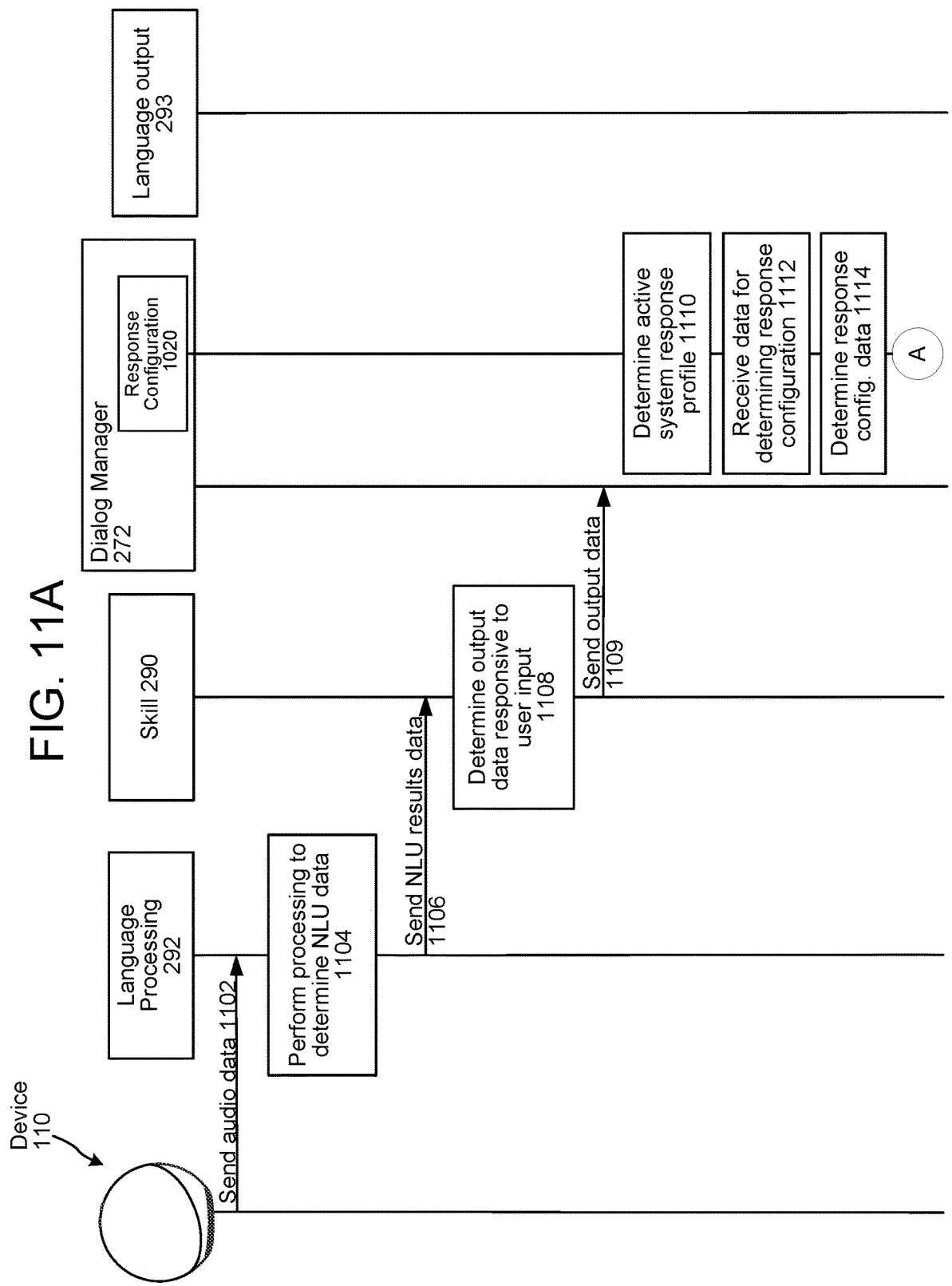

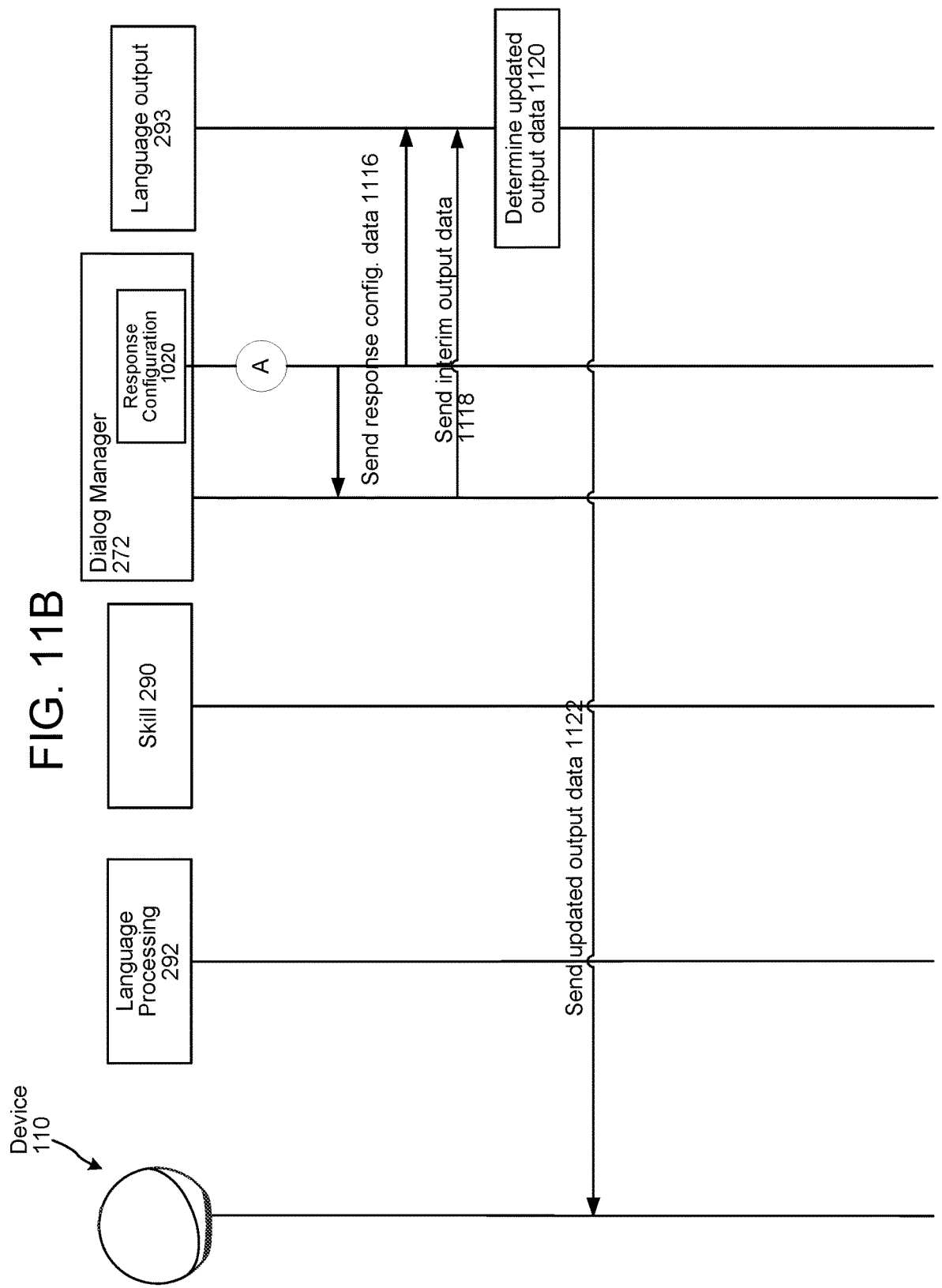

DYNAMIC SYSTEM RESPONSE CONFIGURATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4A illustrates examples of system response configuration profiles and system response configuration data, according to embodiments of the present disclosure.

FIG. 8 is a schematic diagram of an illustrative architecture in which sensor data is combined to recognize one or more users according to embodiments of the present disclosure.

FIG. 9 is a conceptual diagram illustrating a sentiment detection component according to embodiments of the present disclosure.

FIGS. 11A-11B illustrate a signal flow for determining output data based on response settings data according to embodiments of the present disclosure.

DETAILED DESCRIPTION

Figure 1:
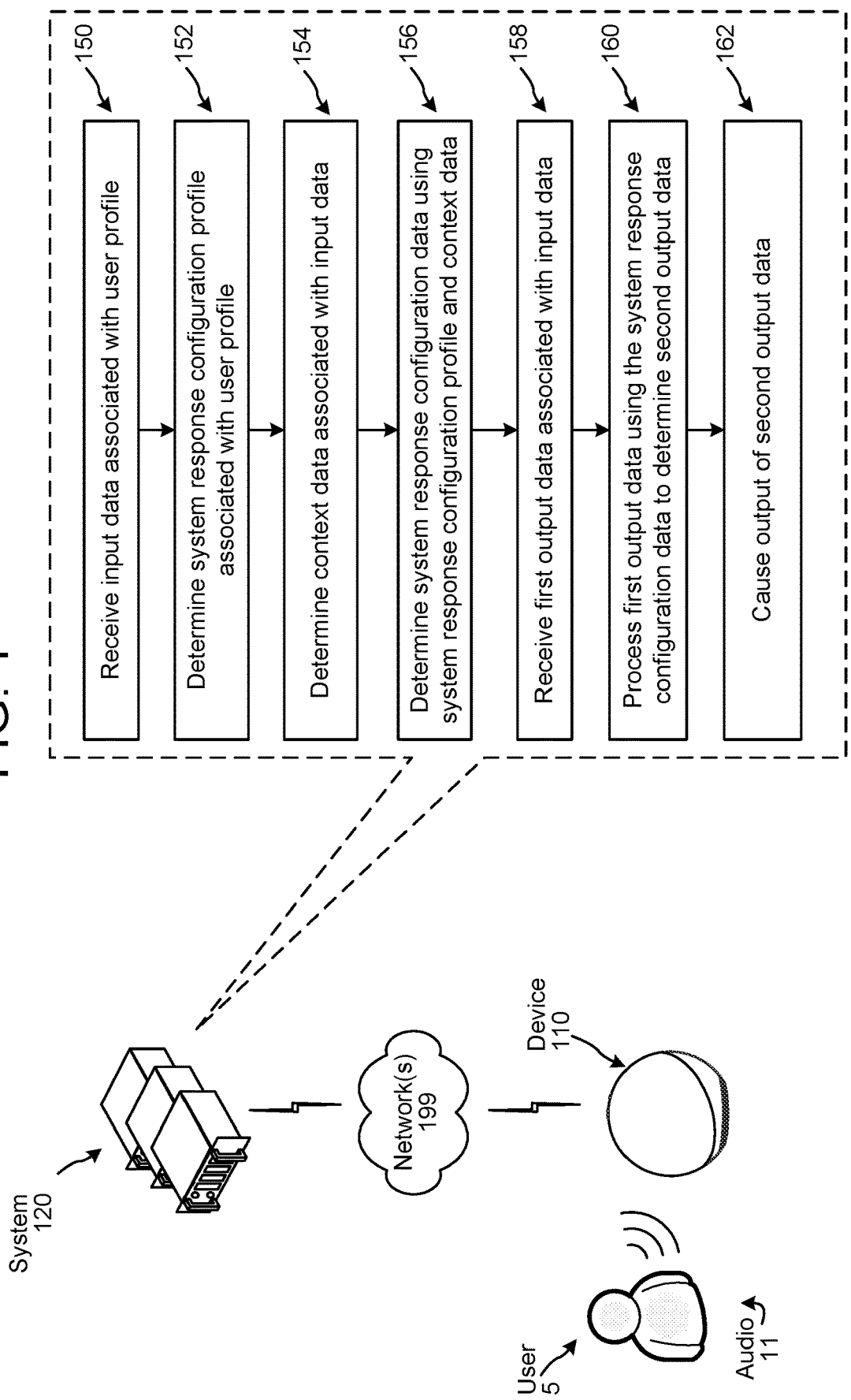
FIG. 1 is a conceptual diagram illustrating a virtual assistant system using dynamic system response configuration profiles and data, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text or other type of word representative data of that speech. Similarly, natural language understanding (NLU) is a field of computer science, artificial intelligence, and linguistics concerned with enabling computers to derive meaning from text or other natural language meaning representation data. ASR and NLU are often used together as part of a speech processing system, sometimes referred to as a spoken language understanding (SLU) system. Text-to-speech (TTS) is a field of computer science concerning transforming textual and/or other meaning representation data into audio data that is synthesized to resemble human speech. ASR, NLU, and TTS may be used together to act as a virtual assistant that can respond to spoken commands and respond with synthesized speech. For example, a voice-controlled user device and/or a speech-processing system may be configured to receive human speech and detect a wakeword used to activate the device and/or other transcribable language in the user input. The device and/or system may determine a command represented by the user input, and use TTS to provide a response in the form of synthesized speech.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

A virtual assistant system may be configured to respond to simultaneously respond to requests from many different users. In order to do so, certain system settings may be less customized than a user may desire. For example, a "voice" of a virtual assistant (e.g., the audio qualities that a system uses to perform TTS/determine synthesized speech output) may be the same for many different users, or may have only a limited number of selections available to a user. To create a more customized user experience, offered is a method and system for creating and using system response configuration profiles, which include sets of data related to different attributes of how a system outputs data/responds to a user input. Such attributes may correspond to perceived personality attributes of the system. Such profiles/attributes may allow a system to offer more customized responses to a user in a manner that is more tailored to the particular user and/or the user's current situation. Such attributes may include factors such as verbosity (e.g., how many words a system uses to provide information), formality (e.g., how formal v. familiar the system output presents to a user), vocal tone, affirmativeness (e.g., how often/when the system may affirmatively offer unsolicited output to a user even if the output is not in direct response to a user input), friendliness, speaking speed, simulated emotion (e.g., whether output data, such as audio or visual output, presents to the user as happy, sad, frustrated, etc.), politeness (e.g., whether the system output presents as polite, neutral, deliberately rude, or the like), or other factors. Such perceived personality attributes of the system represent how an output of the system may be received/interpreted by a user. Such perceived personality attributes may also correspond to output settings such as number of and arrangement of words to include in an output, speed of synthesized speech, speech qualities of synthesized speech (e.g., how vocal characteristics such as prosody, tempo, pitch, accent etc. and how they present in a system output), visual output settings, timing of output, and/or other output qualities.

The various attributes may be represented by system response configuration data, which includes data representing these perceived personality attributes. The system response configuration data may include one or more data structures with values corresponding to the attributes. Each system response configuration profile may correspond to its own set of system response configuration data. A particular user, device, user profile, etc. may be associated with a particular system response configuration profile and, in turn, with particular system response configuration data. The system may allow the user to select a desired system response configuration profile, may incorporate user feedback to adjust the system response configuration profile for a particular user, and may evaluate user behavior to adjust the system response configuration profile for a particular user. The system may also associate multiple system response configuration profiles with a particular user, where a particular profile may change for a user depending on the context. For example, a user during business hours may be associated with one system response configuration profile, but during evening hours may be associated with a different system response configuration profile. The system may use the appropriate system response configuration profile to respond to a user input and/or to offer unsolicited information to the user, depending on the system response configuration profile. The same system response configuration profile may be used for different virtual assistants operable by the system or the system may use different system response configuration profiles for the same user for different virtual assistants depending on the user preferences and permissions.

Further, the system may also adjust the system response configuration data of a particular active system response configuration profile to determine a particular output based on context data. The context data may include various information such as whether any other users are present in a particular environment, data related to the user sentiment (which may include the sentiment of the user speaking a command and/or the sentiment of other users that are present), time of day, calendar information, other activity the user may be engaged in, the device type of a device the user is operating, user behavior information, etc. The system may evaluate a current system response configuration profile setting and slightly adjust its system response configuration data based on the context data and then use the adjusted system response configuration data to determine output data for a user. Thus, for example, if an active system response configuration profile corresponds to a profile to be used during a user's commute home, the system may use the context data to determine adjusted system response configuration data based on the particularities of a particular commute. For example data such as how the user was driving, what music the user was listening to, to whom the user was speaking, whether other users were with the user, the status of the traffic, etc. may all be considered as part of data signals received by the system and considered as context data when determine how (or if) to adjust the system response configuration data of the currently active system response configuration profile.

Determination of the output data using system response configuration data may take different forms such as changing results data to different output data, adjusting the words of an output, adjusting the TTS style of an output, changing an output from audio to visual or haptic (or some other combination thereof), causing an unsolicited system output, changing output from one device to another, cancelling an output entirely, etc.

FIG. 1 is a conceptual diagram illustrating a virtual assistant system 100 for natural language processing, according to embodiments of the present disclosure. As shown in FIG. 1, the virtual assistant system 100 may include a voice-enabled device 110 local to a user 5, a natural language command processing system 120 (abbreviated "system 120"), and one or more skill support systems 125 (shown in FIG. 2) connected across one or more networks 199. Although the figures and discussion of the present disclosure illustrate certain steps in a particular order, the steps described may be performed in a different order (as well as certain steps removed or added) without departing from the present disclosure.

The device 110 may receive audio corresponding to a spoken natural language input originating from the user 5. The device 110 may process audio following detection of a wakeword. The device 110 may generate audio data corresponding to the audio, and may send the audio data to the system 120. The device 110 may send the audio data to the system 120 via an application that is installed on the device 110 and associated with the system 120. An example of such an application is the Amazon Alexa application that may be installed on a smart phone, tablet, or the like. In some implementations, the device 110 may receive text data 213 corresponding to a natural language input originating from the user 5, and send the text data to the system 120. The device 110 may also receive output data from the system 120, and generate a synthesized speech output. The device 110 may include a camera for capturing image and/or video data for processing by the system 120. Examples of various devices 110 are further illustrated in FIG. 15. The system 120 may be remote system such as a group of computing components located geographically remote from device 110 but accessible via network 199 (for example, servers accessible via the internet). The system 120 may also include a remote system that is physically separate from device 110 but located geographically close to device 110 and accessible via network 199 (for example a home server located in a same residence as device 110. System 120 may also include some combination thereof, for example where certain components/operations are performed via a home server(s) and others are performed via a geographically remote server(s).

As shown in FIG. 1, a system may receive (150) input data associated with the user profile. The input data may include audio data, text data, gesture data, or other data, such as data corresponding to a user input designed to solicit a system response. The input data may also correspond to a notification, alarm, or other input not necessarily associated with an affirmative user action. For example, the system may receive news information (e.g., breaking news, a sports score update, etc.), an emergency notification, sensor data update (e.g., a sensor detecting certain information), or the like that may correspond to some output being provided to a device associated with the user profile. The system may determine (152) a system response configuration profile associated with the user profile. The system may also determine (154) context data associated with the input data. The context data may represent various factors associated with the input such as user sentiment, other present users, user vocal speed, time data, etc. The system may then use the system response configuration profile and the context data to determine (156) system response configuration data to be used when preparing the ultimate output to the user. The system may do so by taking some initial system response configuration data associated with the system response configuration profile and altering it based at least in part on the context data. For example, system response configuration data from the system response configuration profile may be altered slightly with respect to values corresponding to one or more output attributes. The respective altered values may be included in the updated system response configuration data to be used to determine the output.

The system may then receive (158) some first output data associated with the input data. This first output data may include, for example, a response to the user input from a skill (which may take the form of text data to be synthesized into speech prior to output), a directive to be executed by device 110 or a different device (such as a peripheral device like a lightbulb, appliance, loudspeaker, or the like), or other output data. The system may then process (160) the first output data using the system response configuration data (e.g., the updated system response configuration data) to determine second output data that is different from the first output data. For example, the first output data may call for certain words to be synthesized into speech but the system determines for the second output data that different words should be synthesized instead (for example a longer version of the response if the appropriate system response configuration data indicates a desired verbose response or a shorter version of the response if the appropriate system response configuration data indicates a desired terse response or if the original words call for a formal wording but the system response configuration data indicates an informal wording should be used). In another example the first output data may call for an audio response but the system determines instead that a visual response is appropriate because the system response configuration data indicates that an audio interruption is in appropriate for the current context. In another example the first output data may call for a certain device (e.g., device 110) to output a response but the system response configuration data indicates that the response should instead be sent to a different device because of an operational state of the device 110 indicates the device 110 is otherwise performing some action that should not be interrupted (e.g., playing music, playing a video, etc.). The system may then cause (162) a system output using the second output data.

Figure 2:
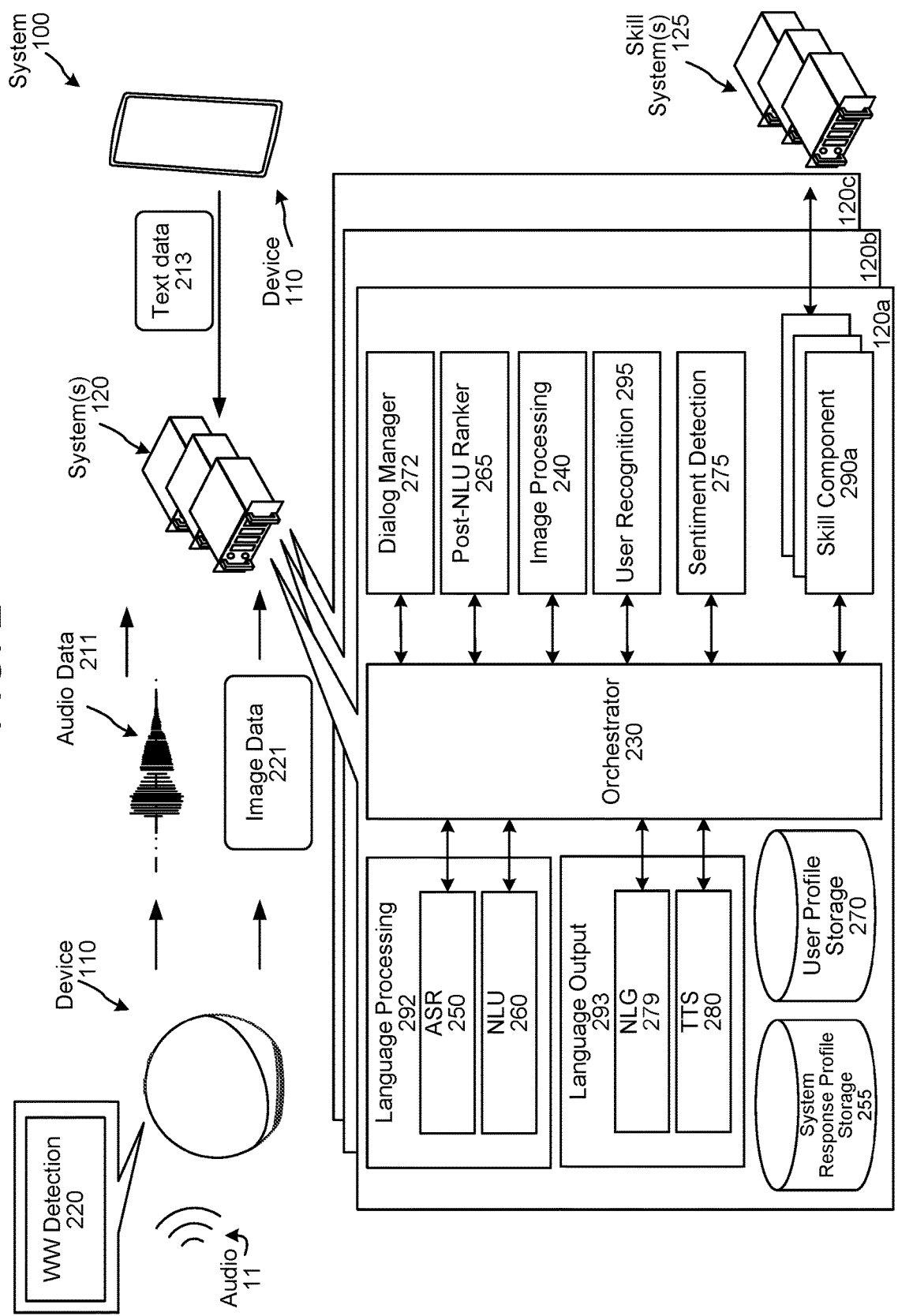
FIG. 2 is a conceptual diagram of components of the system, according to embodiments of the present disclosure.

The system 100 may operate using various components as described in FIG. 2. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa." In another example, input to the system may be in form of text data 213, for example as a result of a user typing an input into a user interface of device 110. Other input forms may include indication that the user has pressed a physical or virtual button on device 110, the user has made a gesture, etc. The device 110 may also capture images using camera(s) 1318 of the device 110 and may send image data 221 representing those image(s) to the system 120. The image data 221 may include raw image data or image data processed by the device 110 before sending to the system 120.

The wakeword detector 220 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 220 and/or input is detected by an input detector, the device 110 may "wake" and begin transmitting audio data 211, representing the audio 11, to the system(s) 120. The audio data 211 may include data corresponding to the wakeword; in other embodiments, the portion of the audio corresponding to the wakeword is removed by the device 110 prior to sending the audio data 211 to the system(s) 120. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detector 220 may result in sending audio data to system 120a for processing while detection of the wakeword "Computer" by the wakeword detector may result in sending audio data to system 120b for processing. The system may have a separate wakeword and system for different skills/systems (e.g., "Dungeon Master" for a game play skill/system 120c) and/or such skills/systems may be coordinated by one or more skill(s) 290 of one or more systems 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 211 to a language processing component 292. The language processing component 292 (sometimes also referred to as a spoken language understanding (SLU) component) includes an automatic speech recognition (ASR) component 250 and a natural language understanding (NLU) component 260. The ASR component 250 may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein.

The speech processing system 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system(s) 120, a skill component 290, a skill system(s) 125, etc.) to execute the intent. For example, if the text data corresponds to "play the $5^{th}$ Symphony by Beethoven," the NLU component 260 may determine an intent that the system output music and may identify "Beethoven" as an artist/composer and "5th Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora such as "this song" or "my next appointment"—the speech processing system 292 can send a decode request to another speech processing system 292 for information regarding the entity mention and/or other context related to the utterance. The speech processing system 292 may augment, correct, or base results data upon the audio data 211 as well as any data received from the other speech processing system 292.

The NLU component 260 may return NLU results data 685/625 (which may include tagged text data, indicators of intent, etc.) back to the orchestrator 230. The orchestrator 230 may forward the NLU results data to a skill component(s) 290. If the NLU results data includes a single NLU hypothesis, the NLU component 260 and the orchestrator component 230 may direct the NLU results data to the skill component(s) 290 associated with the NLU hypothesis. If the NLU results data 685/625 includes an N-best list of NLU hypotheses, the NLU component 260 and the orchestrator component 230 may direct the top scoring NLU hypothesis to a skill component(s) 290 associated with the top scoring NLU hypothesis. The system may also include a post-NLU ranker 265 which may incorporate other information to rank potential interpretations determined by the NLU component 260. The local device 110 may also include its own post-NLU ranker 365, which may operate similarly to the post-NLU ranker 265. The NLU component 260, post-NLU ranker 265 and other components are described in greater detail below with regard to FIGS. 5 and 6.

A skill component may be software running on the system(s) 120 that is akin to a software application. That is, a skill component 290 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 290 may operate in conjunction between the system(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system(s) 125 may communicate with a skill component(s) 290 within the system(s) 120 and/or directly with the orchestrator component 230 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 290 dedicated to interacting with the skill support system(s) 125. Unless expressly stated otherwise, reference to a skill, skill device, or skill component may include a skill component 290 operated by the system(s) 120 and/or skill operated by the skill support system(s) 125. Moreover, the functionality described herein as a skill or skill may be referred to using many different terms, such as an action, bot, app, or the like. The skill 290 and or skill support system(s) 125 may return output data to the orchestrator 230.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 272 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 272 may associate a dialog session identifier with the dialog upon identifying that the user is engaging in a dialog with the user. The dialog manager component 272 may track a user input and the corresponding system generated response to the user input as a turn. The dialog session identifier may correspond to multiple turns of user input and corresponding system generated response. The dialog manager component 272 may transmit data identified by the dialog session identifier directly to the orchestrator component 230 or other component. Depending on system configuration the dialog manager 272 may determine the appropriate system generated response to give to a particular utterance or user input of a turn. Or creation of the system generated response may be managed by another component of the system (e.g., the language output component 293, NLG 279, orchestrator 230, etc.) while the dialog manager 272 selects the appropriate responses. Alternatively, another component of the system(s) 120 may select responses using techniques discussed herein. The text of a system generated response may be sent to a TTS component 280 for creation of audio data corresponding to the response. The audio data may then be sent to a user device (e.g., device 110) for ultimate output to the user. Alternatively (or in addition) a dialog response may be returned in text or some other form.

The dialog manager 272 may receive the ASR hypothesis/hypotheses (i.e., text data) and make a semantic interpretation of the phrase(s) or statement(s) represented therein. That is, the dialog manager 272 determines one or more meanings associated with the phrase(s) or statement(s) represented in the text data based on words represented in the text data. The dialog manager 272 determines a goal corresponding to an action that a user desires be performed as well as pieces of the text data that allow a device (e.g., the device 110, the system(s) 120, a skill 290, a skill system(s) 125, etc.) to execute the intent. If, for example, the text data corresponds to "what is the weather," the dialog manager 272 may determine that that the system(s) 120 is to output weather information associated with a geographic location of the device 110. In another example, if the text data corresponds to "turn off the lights," the dialog manager 272 may determine that the system(s) 120 is to turn off lights associated with the device(s) 110 or the user(s) 5.

The dialog manager 272 may send the results data to one or more skill(s) 290. If the results data includes a single hypothesis, the orchestrator component 230 may send the results data to the skill(s) 290 associated with the hypothesis. If the results data includes an N-best list of hypotheses, the orchestrator component 230 may send the top scoring hypothesis to a skill(s) 290 associated with the top scoring hypothesis.

The system 120 includes a language output component 293. The language output component 293 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280 (e.g., output text data 1210 discussed below). Alternatively or in addition, the TTS component 280 may receive text data from a skill 290 or other system component for output.

The NLG component 279 may include a trained model. The NLG component 279 generates text data 1210 from dialog data received by the dialog manager 272 such that the output text data 1210 has a natural feel and, in some embodiments, includes words and/or phrases specifically formatted for a requesting individual. The NLG may use templates to formulate responses. And/or the NLG system may include models trained from the various templates for forming the output text data 1210. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 290, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system(s) 120 as image data. The device 110 may further include circuitry for voice command-based control of the camera, allowing a user 5 to request capture of image or video data. The device 110 may process the commands locally or send audio data 211 representing the commands to the system(s) 120 for processing, after which the system(s) 120 may return output data that can cause the device 110 to engage its camera.

Upon receipt by the system(s) 120, the image data 221 may be sent to an orchestrator component 230. The orchestrator component 230 may send the image data 221 to an image processing component 240. The image processing component 240 can perform computer vision functions such as object recognition, modeling, reconstruction, etc. For example, the image processing component 240 may detect a person, face, etc. (which may then be identified using user recognition component 295). The device may also include an image processing component 340 which operates similarly to image processing component 240.

In some implementations, the image processing component 240 can detect the presence of text in an image. In such implementations, the image processing component 240 can recognize the presence of text, convert the image data to text data, and send the resulting text data via the orchestrator component 230 to the language processing component 292 for processing by the NLU component 260.

The system(s) 120 may include a user recognition component 295 that recognizes one or more users using a variety of data, as described in greater detail below. However, the disclosure is not limited thereto, and the device 110 may include a user recognition component 395 instead of and/or in addition to user recognition component 295 of the system(s) 120 without departing from the disclosure. User recognition component 395 operates similarly to user recognition component 295.

The user-recognition component 295 may take as input the audio data 211 and/or text data output by the ASR component 250. The user-recognition component 295 may perform user recognition by comparing audio characteristics in the audio data 211 to stored audio characteristics of users. The user-recognition component 295 may also perform user recognition by comparing biometric data (e.g., fingerprint data, iris data, etc.), received by the system in correlation with the present user input, to stored biometric data of users assuming user permission and previous authorization. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The user profile storage 270 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The user profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The user profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system(s) 120 may also include a sentiment detection component 275 that may be configured to detect a sentiment of a user from audio data representing speech/utterances from the user, image data representing an image of the user, and/or the like as described in greater detail below with regard to FIG. 9. The sentiment detection component 275 may be included in system(s) 120, as illustrated in FIG. 2, although the disclosure is not limited thereto and the sentiment detection component 275 may be included in other components without departing from the disclosure. For example the sentiment detection component 375 may be included in the device 110, as a separate component, etc. Sentiment detection component 375 may operate similarly to sentiment detection component 275. The system 120 may use the sentiment detection component 275 to, for example, customize a response for a user based on an indication that the user is happy or frustrated.

The system(s) 120 may also include system response profile data storage 255. The system response profile data storage 255 may store information related to system response configuration profiles and data that may be used by the system to craft outputs that are more customized and responsive to users and the particular context of the data to be output. Further discussions of the system response profile data storage 255 may be found herein, for example in reference to FIG. 4A.

Figure 3:
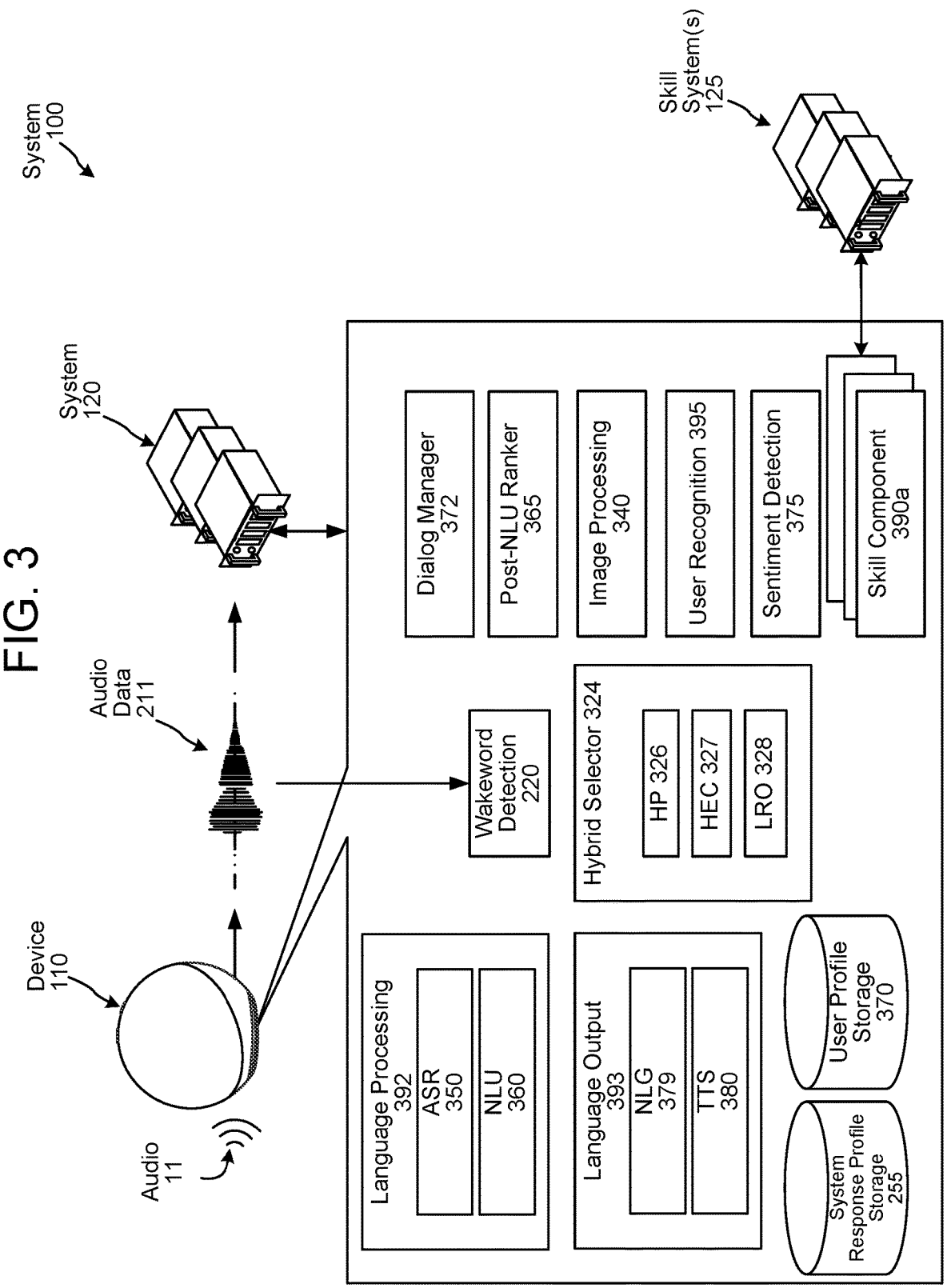
FIG. 3 is a conceptual diagram illustrating components that may be included in a device, according to embodiments of the present disclosure.

Although the components of FIG. 2 may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 3 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or the ASR component 350. The wakeword detection component 220 may also send an indication, to the hybrid selector 324, representing a wakeword was not detected. In response to receiving such an indication, the hybrid selector 324 may refrain from sending the audio data 211 to the system 120, and may prevent the ASR component 350 from further processing the audio data 211. In this situation, the audio data 211 can be discarded.

The device 110 may conduct its own speech processing using on-device language processing components, such as an SLU/language processing component 392 (which may include an ASR component 350 and an NLU 360), similar to the manner discussed herein with respect to the SLU component 292 (or ASR component 250 and the NLU component 260) of the system 120. Language processing component 392 may operate similarly to language processing component 292, ASR component 350 may operate similarly to ASR component 250 and NLU component 360 may operate similarly to NLU component 260. The device 110 may also internally include, or otherwise have access to, other components such as one or more skill components 390 capable of executing commands based on NLU output data or other results determined by the device 110/system 120 (which may operate similarly to skill components 290), a user recognition component 395 (configured to process in a similar manner to that discussed herein with respect to the user recognition component 295 of the system 120), profile storage 370 (configured to store similar profile data to that discussed herein with respect to the profile storage 270 of the system 120), or other components. In at least some embodiments, the profile storage 370 may only store profile data for a user or group of users specifically associated with the device 110. Similar to as described above with respect to skill component 290, a skill component 390 may communicate with a skill system(s) 125. The device 110 may also have its own language output component 393 which may include NLG component 379 and TTS component 380. Language output component 393 may operate similarly to language processing component 293, NLG component 379 may operate similarly to NLG component 279 and TTS component 380 may operate similarly to TTS component 280.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of local language processing when new audio data 211 becomes available. In general, the hybrid selector 324 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the system 120 or the local language processing components. However, the disclosure is not limited thereto, and in some examples the hybrid selector 324 may send the audio data 211 only to the local ASR component 350 without departing from the disclosure. For example, the device 110 may process the audio data 211 locally without sending the audio data 211 to the system 120.

The local ASR component 350 is configured to receive the audio data 211 from the hybrid selector 324, and to recognize speech in the audio data 211, and the local NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 211 to the system 120, and the response data from the system 120 may include the unique identifier to identify which natural language user input the response data corresponds.

In at least some embodiments, the device 110 may include, or be configured to use, one or more skill components 390 that may work similarly to the skill component(s) 290 implemented by the system 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 390, a skill system 125, or a combination of a skill component 390 and a corresponding skill system 125.

Similar to the manner discussed with regard to FIG. 2, the local device 110 may be configured to recognize multiple different wakewords and/or perform different categories of tasks depending on the wakeword. Such different wakewords may invoke different processing components of local device 110 (not illustrated in FIG. 3). For example, detection of the wakeword "Alexa" by the wakeword detector 220 may result in sending audio data to certain language processing components 392/skills 390 for processing while detection of the wakeword "Computer" by the wakeword detector may result in sending audio data different language processing components 392/skills 390 for processing.

FIG. 4A illustrates examples of system response configuration profiles and system response configuration data 256, for example as stored by system response profile data storage 255. As illustrated, the system may incorporate a variety of system response configuration profiles, each associated with its own set of system response configuration data. The system response configuration data may be in different forms, for example in a form where a certain value corresponds to a particular perceived personality attribute of the system used for determining output data.

The system response configuration data values may correspond to how the system configures a particular aspect of output data. For example, verbosity may correspond to how many words a system uses to provide information where 0 may represent no words at all (e.g., the system should resort to providing visual, haptic, or other output rather than synthesized speech), 0.1 may represent extremely terse output using a minimum number of words possible, while 1.0 may represent a garrulous response where the system provides lengthy responses. Friendliness may represent how friendly the system appears to the user where 0.1 may represent unfriendly response while 1.0 may represent overly friendly. Formality representing how formal v. familiar the system output presents to a user where 0.1 may represent extreme informality and familiarity while 1.0 may represent extreme formality. Politeness may represent whether the system output presents as polite, neutral, deliberately rude, or the like where 0.1 may represent extreme rudeness while 1.0 may represent extreme politeness. Happiness may represent whether the system output presents as happy, where 0.1 may represent not happy at all while 1.0 may represent extreme happiness. (Although happiness is illustrated, other simulated emotions may also be represented in the system response configuration data 256.) Affirmative may represent how affirmative the system behaves with regard to providing content that may not necessarily have been requested by a user where 0.1 represents the system only providing information directly responsive to a user input while 1.0 may represent the system being configured to regularly provide unsolicited content that the system determines may improve the user experience (for example, offering suggestions for skills, operations, new media, etc., offering news or weather reports, notifying a user of upcoming appointments, or the like).

Although FIG. 4A illustrates only a certain number of profiles and a certain number of perceived personality attributes for each profile, many different profiles and many different attributes per profile may be used by the system. Further, not every perceived personality attribute need be represented in every profile such that certain profiles may not necessarily include values for a particular attribute, allowing the system to use some other value for the particular attribute (such as a default value, neutral value, value from some initial output data, or the like). Further, although system response configuration data 256 is represented as a value between 0 and 1, other data values may be used to represent system response attributes. For example, binned values may be used such as "none," "low," "medium," "high," or the like. Further, a particular profile may be represented by a data structure or other data that may not necessarily correlate directly to a particular attribute but may rather represented encoded data to be used by a machine learning/trained model by one or more downstream components (e.g., NLG 279, TTS 280, etc.) to create output data corresponding to the profile without certain data values corresponding directly to certain attributes.

Particular system response configuration data values associated with a particular perceived personality attribute may be associated with one or more rules of certain system components. For example, if a certain attribute value is within a certain value range, or above or below a certain threshold value, a system component may take certain actions accordingly (e.g., using a particular template, cancelling or activating certain system functions, etc.).

The different system response configuration data 256 (and/or adjusted system response configuration data 1022 discussed below) may be used by downstream components to configure system operations (e.g., configure certain output settings based at least in part on the system response configuration data). For example, the different system response configuration data 256/1022 may be used by NLG component 279/379 to determine a type/arrangement of words for an output that may be different from those provided by a skill in response to the user input. Thus the NLG component may customize the selected words based on the system response configuration data 256/1022 for a particular context. A TTS component 280/380 may use system response configuration data 256/1022 to determine what tone/speed/voice data, etc. should be used to synthesize speech corresponding to the words (e.g., the words selected by NLG component 279/379). A dialog manager 272/372 (for example using action selector 1018 discussed below) may use system response configuration data 256/1022 to determine what output a system should create, whether that output should be visual, audio, or haptic, what device that output should be directed to, whether the user should be addressed by name or title, etc.

The system response configuration data 256/1022 may also be used by other components of the system. For example, system response configuration data 256/1022 (such as the values themselves or a profile ID) may be provided to a skill 290/390 to allow the skill to customize its response based on the appropriate system response configuration data 256/1022.

Each profile may also correspond to a profile ID, allowing the system to refer to particular profiles, which may be shared among different users, contexts, etc.

Figure 4B:
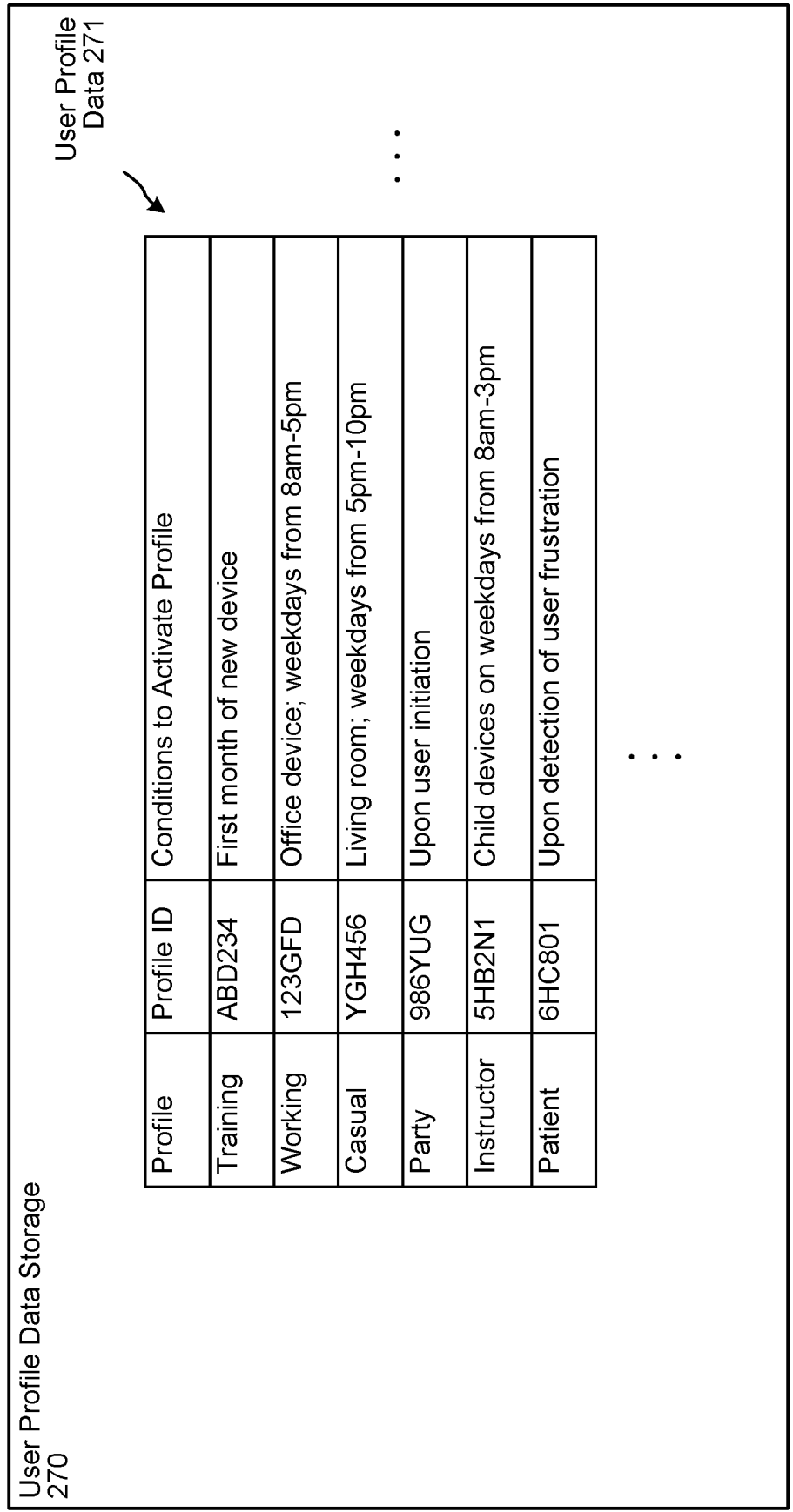
FIG. 4B illustrates examples of user profile data indicating certain system response configuration profiles, according to embodiments of the present disclosure.

FIG. 4B illustrates an example of user profile data 271 corresponding to a particular user profile and the circumstances in which a particular system response configuration profile should be active for the particular user profile. As illustrated, the user profile may be associated with multiple system response configuration profiles, which the circumstances under which a particular system response configuration profile should be active. For example, a training profile ABD234 should be active for a new device for the first month of the new device, for example to train a user on operation of the new device. A working profile 123GFD may be active for an office device during weekdays from 8 am to 5 pm. An instructor profile 5HB2N1 may be active for child devices during weekdays from 8 am to 3 pm. A patient profile 6HC801 may be active upon detection of user frustration (e.g., when frustration is indicated by sentiment data). As can be appreciated, many different such profiles may be available to be used with different user profiles depending on system configuration. Further, variations of a system response configuration profile may be used for different user profiles. Thus one user profile may use the system response configuration "Training" profile ABD234 while another user profile may use a system response configuration "Training2" profile ABD235 which may be similar to the "Training" profile ABD234 only with one or more values changed (e.g., a verbosity value of 0.8 instead of 0.7). Thus different system response configuration profiles may be used depending on what perceived personality attributes the system should have when providing output data under particular conditions.

Other conditions may also be used to determine when to activate a particular system response configuration profile. For example, if a user speaks a particular phrase (e.g., "I had a bad day at work"), which may be recognized by the language processing components 292/392, the system may activate a particular profile associated with the phrase. Particular profiles may also be associated with certain routines, such that when the system determines that it should execute a routine (either in response to a user execution command or under other routine-initiation conditions), the system may activate a profile corresponding to the routine.

Upon activation of a particular system response configuration profile the system may update the active system response configuration data 256. The system may also send data to one or more components to indicate that a new system response configuration profile has been activated. This may be used by such components to change their operation (e.g., adjust their operations with regard to proactive actions, adjust other output, etc.).

The system may perform various processing to determine which system response configuration profiles to associate with which user profiles and under which conditions. For example, during initial operation of a new device the system may default to a training or similar system response configuration profile that allows the system to guide the user through the new device in a manner that is likely to assist the user. The system may also select a system response configuration profile based on geographic region or other information known about the user based on the user profile. For example a system response configuration profile of one type (e.g., training, working, instructor, etc.) may be associated with one region and another system response configuration profile of the same type may be associated with another region with the profiles being configured based on desired system operations for users within that region. Different system response configuration profiles of the same type may also be associated with different languages, dialects, etc. Thus if the system detects a switch from one language to another, the system may switch system response configuration profiles.

The system may allow a user to directly select a system response configuration profile and corresponding operating conditions, for example using voice commands (as processed by language processing component 292/392), a user interface such as a graphical user interface on a device 110 or companion device or website, and/or other combination of system response configuration profile selection. The system may thus receive input data indicating a system response configuration profile that should be associated with a user profile, user device, etc. and under what conditions. The system also receive input data indicating whether one or more perceived personality attribute values of a particular system response configuration should be customized for a particular user profile, thus offering further customizability. The system may then create a new system response configuration profile with the customized attribute value(s) so the new system response configuration profile may be further used by the user/system.

The system may also operate one or more training components (not illustrated) to incorporate explicit or implicit feedback by a user to switch profiles and/or attributes within a profile. With user permission, the training component may process user behavior under certain conditions (e.g., as represented by context data under those conditions) and may adjust a system response configuration profile/data for the particular user. For example, if the system detects sentiment data reflecting frustration when operating a particular system response configuration profile for a user, the system, for the conditions under which it detects the sentiment data reflecting frustration, may determine to change to a different system response configuration profile/data for the particular user. The system may also adjust a system response configuration profile/data depending on a user's speaking style so the system may compliment the system's output to the behavior baselines of a user. The system may thus determine a system response configuration profile to operate under specific conditions based on an evaluation of the user's behavior under those specific conditions. Evaluation of the user's behavior may consider data such as the number of words the user uses when speaking to the system (or to other users), the verbosity, friendliness (or other perceived personality attribute of the system) of the user's speech, the user's response to different types of system outputs, whether the user asks follow up questions and the characteristics of those follow up questions, etc. The system may attempt to match a user's style in certain circumstances. For example, the user may explicitly indicate to the system (in a learning mode or otherwise) for the system to evaluate the user's behavior under certain conditions and to mimic that behavior when the conditions arise. For example, if user behaves in a particular manner toward children when engaged in a learning exercise (for example using more detailed explanatory language in a different vocal tone, etc.) the system may set attribute values accordingly for an instructor mode for use when operating with respect to child devices during school hours.

For example, the system may determine that during work hours a user prefers the system to be terse and formal with its responses but during evening hours the user prefers the system to be more talkative, less formal, and more affirmative when providing output data. The system may thus adjust a system response configuration profile/data to reflect those user behaviors in order to provide a better user experience. The system may then use the adjusted system response configuration profile/data under the appropriate conditions.

Figure 5:
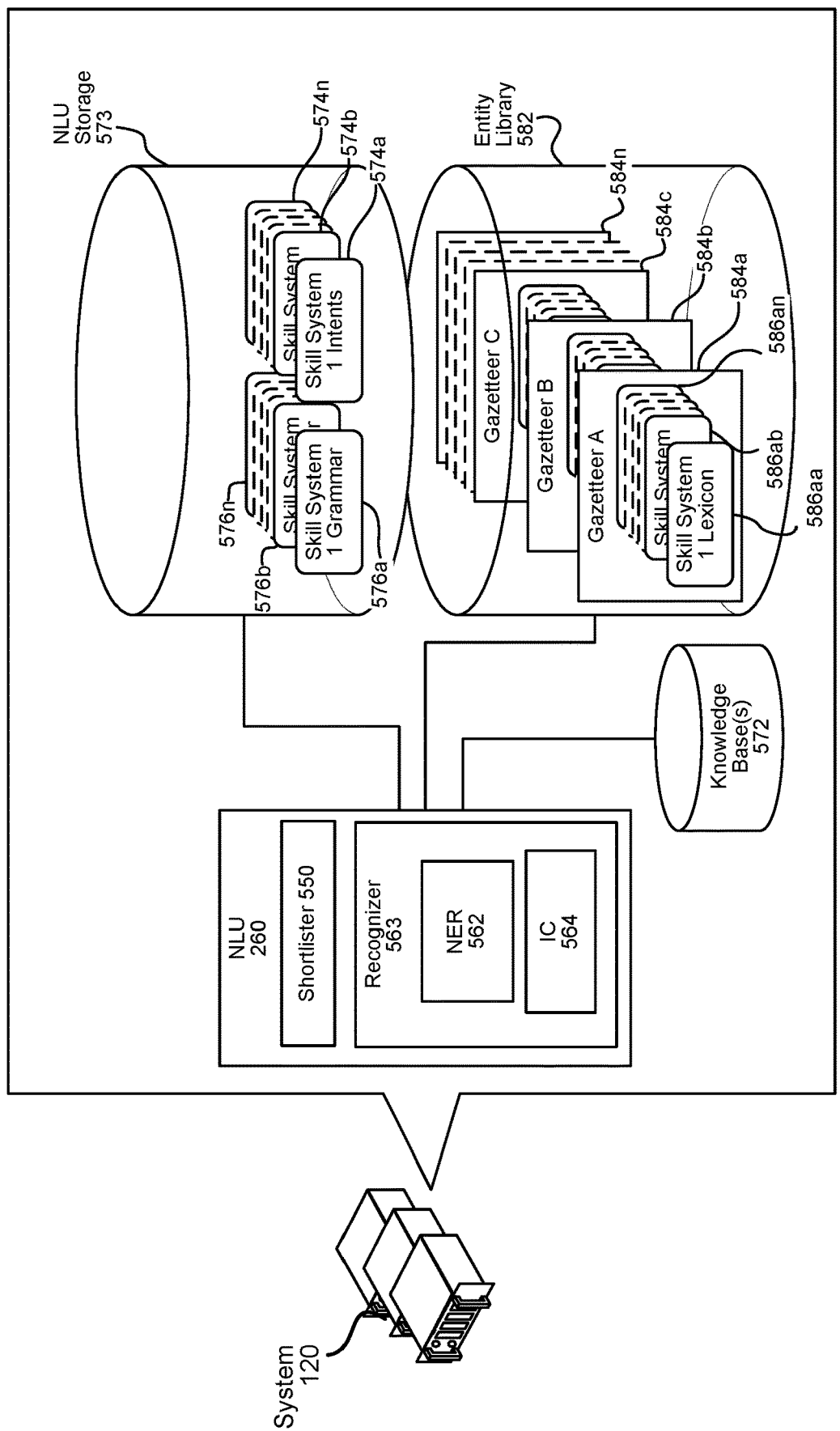
FIG. 5 is a conceptual diagram of how natural language processing is performed, according to embodiments of the present disclosure.
Figure 6:
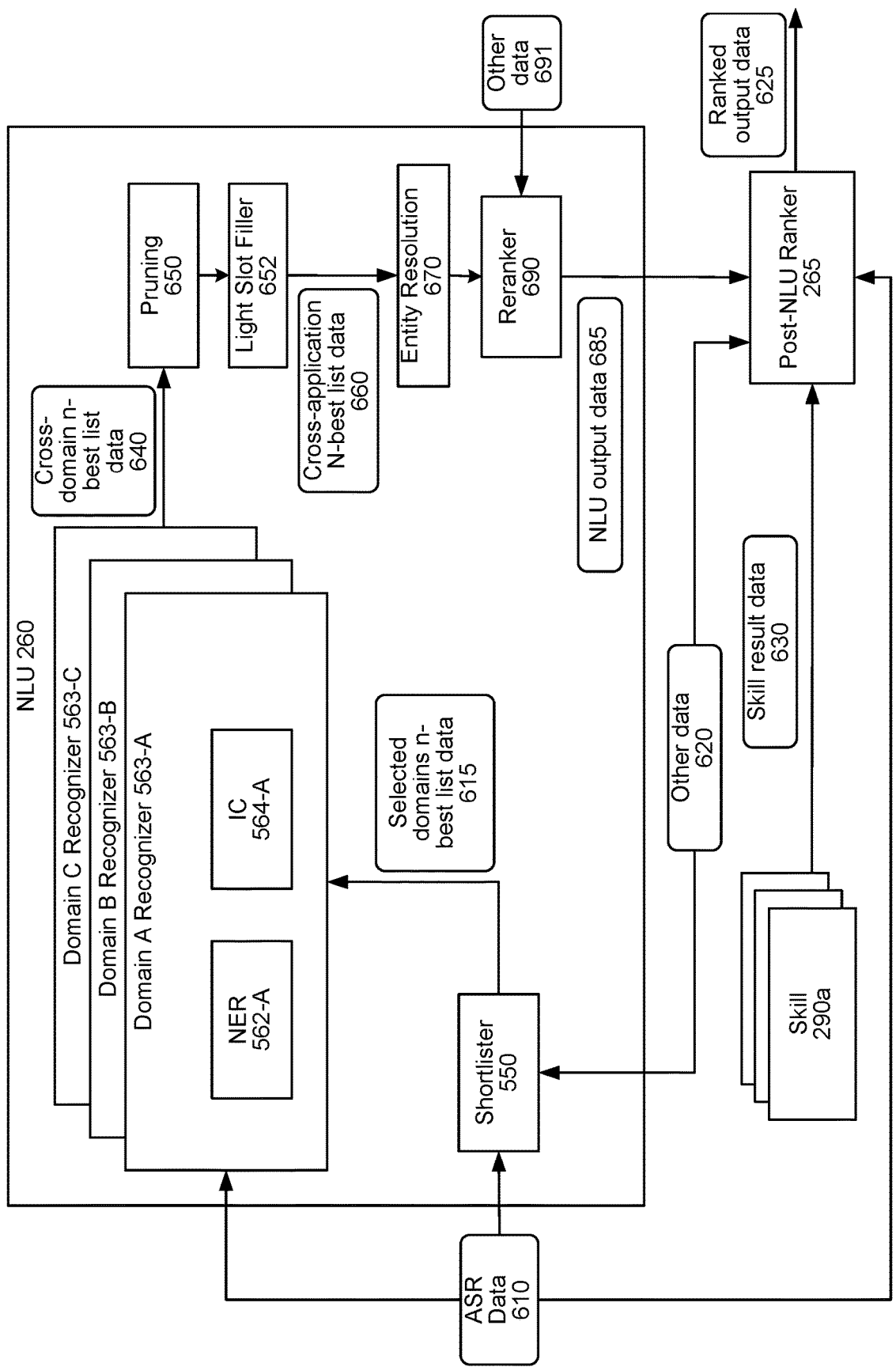
FIG. 6 is a conceptual diagram of how natural language processing is performed, according to embodiments of the present disclosure.

FIGS. 5 and 6 illustrates how the NLU component 260 may perform NLU processing. FIG. 5 is a conceptual diagram of how natural language processing is performed, according to embodiments of the present disclosure. And FIG. 6 is a conceptual diagram of how natural language processing is performed, according to embodiments of the present disclosure.

FIG. 5 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 550. The shortlister component 550 selects skills that may execute with respect to ASR output data 610 input to the NLU component 260 (e.g., applications that may execute with respect to the user input). The ASR output data 610 (which may also be referred to as ASR data 610) may include representations of text of an utterance, such as words, subword units, or the like. The shortlister component 550 thus limits downstream, more resource intensive NLU processes to being performed with respect to skills that may execute with respect to the user input.

Without a shortlister component 550, the NLU component 260 may process ASR output data 610 input thereto with respect to every skill of the system, either in parallel, in series, or using some combination thereof. By implementing a shortlister component 550, the NLU component 260 may process ASR output data 610 with respect to only the skills that may execute with respect to the user input. This reduces total compute power and latency attributed to NLU processing.

The shortlister component 550 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 550 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 550 may be trained with respect to a different skill. Alternatively, the shortlister component 550 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 550. For example, some sample user inputs may be positive examples (e.g., user inputs that may be used to invoke the skill). Other sample user inputs may be negative examples (e.g., user inputs that may not be used to invoke the skill).

As described above, the shortlister component 550 may include a different trained model for each skill of the system, a different trained model for each domain, or some other combination of trained model(s). For example, the shortlister component 550 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 550 to output indications of only a portion of the skills that the ASR output data 610 may relate to. For example, a user input may correspond to "tell me about Tom Collins." If the model is clustered based on domain, the shortlister component 550 may determine the user input corresponds to a recipe skill (e.g., a drink recipe) even though the user input may also correspond to an information skill (e.g., including information about a person named Tom Collins).

The NLU component 260 may include one or more recognizers 563. In at least some embodiments, a recognizer 563 may be associated with a skill system 125 (e.g., the recognizer may be configured to interpret text data to correspond to the skill system 125). In at least some other examples, a recognizer 563 may be associated with a domain such as smart home, video, music, weather, custom, etc. (e.g., the recognizer may be configured to interpret text data to correspond to the domain).

If the shortlister component 550 determines ASR output data 610 is potentially associated with multiple domains, the recognizers 563 associated with the domains may process the ASR output data 610, while recognizers 563 not indicated in the shortlister component 550's output may not process the ASR output data 610. The "shortlisted" recognizers 563 may process the ASR output data 610 in parallel, in series, partially in parallel, etc. For example, if ASR output data 610 potentially relates to both a communications domain and a music domain, a recognizer associated with the communications domain may process the ASR output data 610 in parallel, or partially in parallel, with a recognizer associated with the music domain processing the ASR output data 610.

Each recognizer 563 may include a named entity recognition (NER) component 562. The NER component 562 attempts to identify grammars and lexical information that may be used to construe meaning with respect to text data input therein. The NER component 562 identifies portions of text data that correspond to a named entity associated with a domain, associated with the recognizer 563 implementing the NER component 562. The NER component 562 (or other component of the NLU component 260) may also determine whether a word refers to an entity whose identity is not explicitly mentioned in the text data, for example "him," "her," "it" or other anaphora, exophora, or the like.

Each recognizer 563, and more specifically each NER component 562, may be associated with a particular grammar database 576, a particular set of intents/actions 574, and a particular personalized lexicon 586. Each gazetteer 584 may include domain/skill-indexed lexical information associated with a particular user and/or device 110. For example, a Gazetteer A (584a) includes skill-indexed lexical information 586aa to 586an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 562 applies grammar information 576 and lexical information 586 associated with a domain (associated with the recognizer 563 implementing the NER component 562) to determine a mention of one or more entities in text data. In this manner, the NER component 562 identifies "slots" (each corresponding to one or more particular words in text data) that may be useful for later processing. The NER component 562 may also label each slot with a type (e.g., noun, place, city, artist name, song name, etc.).

Each grammar database 576 includes the names of entities (i.e., nouns) commonly found in speech about the particular domain to which the grammar database 576 relates, whereas the lexical information 586 is personalized to the user and/or the device 110 from which the user input originated. For example, a grammar database 576 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (584a-584n) stored in an entity library storage 582. The gazetteer information 584 may be used to match text data (representing a portion of the user input) with text data representing known entities, such as song titles, contact names, etc. Gazetteers 584 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 563 may also include an intent classification (IC) component 564. An IC component 564 parses text data to determine an intent(s) (associated with the domain associated with the recognizer 563 implementing the IC component 564) that potentially represents the user input. An intent represents to an action a user desires be performed. An IC component 564 may communicate with a database 574 of words linked to intents. For example, a music intent database may link words and phrases such as "quiet," "volume off," and "mute" to a <Mute> intent. An IC component 564 identifies potential intents by comparing words and phrases in text data (representing at least a portion of the user input) to the words and phrases in an intents database 574 (associated with the domain that is associated with the recognizer 563 implementing the IC component 564).

The intents identifiable by a specific IC component 564 are linked to domain-specific (i.e., the domain associated with the recognizer 563 implementing the IC component 564) grammar frameworks 576 with "slots" to be filled. Each slot of a grammar framework 576 corresponds to a portion of text data that the system believes corresponds to an entity. For example, a grammar framework 576 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 576 may not be structured as sentences, but rather based on associating slots with grammatical tags.

For example, an NER component 562 may parse text data to identify words as subject, object, verb, preposition, etc. based on grammar rules and/or models prior to recognizing named entities in the text data. An IC component 564 (implemented by the same recognizer 563 as the NER component 562) may use the identified verb to identify an intent. The NER component 562 may then determine a grammar model 576 associated with the identified intent. For example, a grammar model 576 for an intent corresponding to <PlayMusic> may specify a list of slots applicable to play the identified "object" and any object modifier (e.g., a prepositional phrase), such as {Artist Name}, {Album Name}, {Song name}, etc. The NER component 562 may then search corresponding fields in a lexicon 586 (associated with the domain associated with the recognizer 563 implementing the NER component 562), attempting to match words and phrases in text data the NER component 562 previously tagged as a grammatical object or object modifier with those identified in the lexicon 586.

An NER component 562 may perform semantic tagging, which is the labeling of a word or combination of words according to their type/semantic meaning. An NER component 562 may parse text data using heuristic grammar rules, or a model may be constructed using techniques such as Hidden Markov Models, maximum entropy models, log linear models, conditional random fields (CRF), and the like. For example, an NER component 562 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 562 identifies "Play" as a verb based on a word database associated with the music domain, which an IC component 564 (also implemented by the music domain recognizer) may determine corresponds to a <PlayMusic> intent. At this stage, no determination has been made as to the meaning of "mother's little helper" or "the rolling stones," but based on grammar rules and models, the NER component 562 has determined the text of these phrases relates to the grammatical object (i.e., entity) of the user input represented in the text data.

An NER component 562 may tag text data to attribute meaning thereto. For example, an NER component 562 may tag "play mother's little helper by the rolling stones" as: {domain} Music, {intent}<PlayMusic>, {artist name} rolling stones, {media type} SONG, and {song title} mother's little helper. For further example, the NER component 562 may tag "play songs by the rolling stones" as: {domain} Music, {intent}<PlayMusic>, {artist name} rolling stones, and {media type} SONG.

The shortlister component 550 may receive ASR output data 610 output from the ASR component 250 or output from the device 110b (as illustrated in FIG. 6). The ASR component 250 may embed the ASR output data 610 into a form processable by a trained model(s) using sentence embedding techniques as known in the art. Sentence embedding results in the ASR output data 610 including text in a structure that enables the trained models of the shortlister component 650 to operate on the ASR output data 610. For example, an embedding of the ASR output data 610 may be a vector representation of the ASR output data 610.

The shortlister component 550 may make binary determinations (e.g., yes or no) regarding which domains relate to the ASR output data 610. The shortlister component 550 may make such determinations using the one or more trained models described herein above. If the shortlister component 550 implements a single trained model for each domain, the shortlister component 550 may simply run the models that are associated with enabled domains as indicated in a user profile associated with the device 110 and/or user that originated the user input.

The shortlister component 550 may generate n-best list data 615 representing domains that may execute with respect to the user input represented in the ASR output data 610. The size of the n-best list represented in the n-best list data 615 is configurable. In an example, the n-best list data 615 may indicate every domain of the system as well as contain an indication, for each domain, regarding whether the domain is likely capable to execute the user input represented in the ASR output data 610. In another example, instead of indicating every domain of the system, the n-best list data 615 may only indicate the domains that are likely to be able to execute the user input represented in the ASR output data 610. In yet another example, the shortlister component 550 may implement thresholding such that the n-best list data 615 may indicate no more than a maximum number of domains that may execute the user input represented in the ASR output data 610. In an example, the threshold number of domains that may be represented in the n-best list data 615 is ten. In another example, the domains included in the n-best list data 615 may be limited by a threshold a score, where only domains indicating a likelihood to handle the user input is above a certain score (as determined by processing the ASR output data 610 by the shortlister component 550 relative to such domains) are included in the n-best list data 615.

The ASR output data 610 may correspond to more than one ASR hypothesis. When this occurs, the shortlister component 550 may output a different n-best list (represented in the n-best list data 615) for each ASR hypothesis. Alternatively, the shortlister component 550 may output a single n-best list representing the domains that are related to the multiple ASR hypotheses represented in the ASR output data 610.

As indicated above, the shortlister component 550 may implement thresholding such that an n-best list output therefrom may include no more than a threshold number of entries. If the ASR output data 610 includes more than one ASR hypothesis, the n-best list output by the shortlister component 550 may include no more than a threshold number of entries irrespective of the number of ASR hypotheses output by the ASR component 250. Alternatively or in addition, the n-best list output by the shortlister component 550 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 610, the shortlister component 550 may generate confidence scores representing likelihoods that domains relate to the ASR output data 610. If the shortlister component 550 implements a different trained model for each domain, the shortlister component 550 may generate a different confidence score for each individual domain trained model that is run. If the shortlister component 550 runs the models of every domain when ASR output data 610 is received, the shortlister component 550 may generate a different confidence score for each domain of the system. If the shortlister component 550 runs the models of only the domains that are associated with skills indicated as enabled in a user profile associated with the device 110 and/or user that originated the user input, the shortlister component 550 may only generate a different confidence score for each domain associated with at least one enabled skill. If the shortlister component 550 implements a single trained model with domain specifically trained portions, the shortlister component 550 may generate a different confidence score for each domain who's specifically trained portion is run. The shortlister component 550 may perform matrix vector modification to obtain confidence scores for all domains of the system in a single instance of processing of the ASR output data 610.

N-best list data 615 including confidence scores that may be output by the shortlister component 550 may be represented as, for example:

Search domain, 0.67
Recipe domain, 0.62
Information domain, 0.57
Shopping domain, 0.42

As indicated, the confidence scores output by the shortlister component 550 may be numeric values. The confidence scores output by the shortlister component 550 may alternatively be binned values (e.g., high, medium, low).

The n-best list may only include entries for domains having a confidence score satisfying (e.g., equaling or exceeding) a minimum threshold confidence score. Alternatively, the shortlister component 550 may include entries for all domains associated with user enabled skills, even if one or more of the domains are associated with confidence scores that do not satisfy the minimum threshold confidence score.

The shortlister component 550 may consider other data 620 when determining which domains may relate to the user input represented in the ASR output data 610 as well as respective confidence scores. The other data 620 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 620 may include an indicator of the user associated with the ASR output data 610, for example as determined by the user recognition component 295.

The other data 620 may be character embedded prior to being input to the shortlister component 550. The other data 620 may alternatively be embedded using other techniques known in the art prior to being input to the shortlister component 550.

The other data 620 may also include data indicating the domains associated with skills that are enabled with respect to the device 110 and/or user that originated the user input. The shortlister component 550 may use such data to determine which domain-specific trained models to run. That is, the shortlister component 550 may determine to only run the trained models associated with domains that are associated with user-enabled skills. The shortlister component 550 may alternatively use such data to alter confidence scores of domains.

As an example, considering two domains, a first domain associated with at least one enabled skill and a second domain not associated with any user-enabled skills of the user that originated the user input, the shortlister component 550 may run a first model specific to the first domain as well as a second model specific to the second domain. Alternatively, the shortlister component 550 may run a model configured to determine a score for each of the first and second domains. The shortlister component 550 may determine a same confidence score for each of the first and second domains in the first instance. The shortlister component 550 may then alter those confidence scores based on which domains is associated with at least one skill enabled by the present user. For example, the shortlister component 550 may increase the confidence score associated with the domain associated with at least one enabled skill while leaving the confidence score associated with the other domain the same. Alternatively, the shortlister component 550 may leave the confidence score associated with the domain associated with at least one enabled skill the same while decreasing the confidence score associated with the other domain. Moreover, the shortlister component 550 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 550 receives the ASR output data 610, the shortlister component 550 may determine whether profile data associated with the user and/or device 110 that originated the command includes an indication of enabled skills.

The other data 620 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 550 may use such data to determine which domain-specific trained models to run. For example, if the device 110 corresponds to a displayless type device, the shortlister component 550 may determine not to run trained models specific to domains that output video data. The shortlister component 550 may alternatively use such data to alter confidence scores of domains.

As an example, considering two domains, one that outputs audio data and another that outputs video data, the shortlister component 550 may run a first model specific to the domain that generates audio data as well as a second model specific to the domain that generates video data. Alternatively the shortlister component 550 may run a model configured to determine a score for each domain. The shortlister component 550 may determine a same confidence score for each of the domains in the first instance. The shortlister component 550 may then alter the original confidence scores based on the type of the device 110 that originated the user input corresponding to the ASR output data 610. For example, if the device 110 is a displayless device, the shortlister component 550 may increase the confidence score associated with the domain that generates audio data while leaving the confidence score associated with the domain that generates video data the same. Alternatively, if the device 110 is a displayless device, the shortlister component 550 may leave the confidence score associated with the domain that generates audio data the same while decreasing the confidence score associated with the domain that generates video data. Moreover, if the device 110 is a displayless device, the shortlister component 550 may increase the confidence score associated with the domain that generates audio data as well as decrease the confidence score associated with the domain that generates video data.

The type of device information represented in the other data 620 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 620 may represent the smart TV of other display device, and not the displayless device that captured the spoken user input.

The other data 620 may also include data indicating the user input originating device's speed, location, or other mobility information. For example, the device may correspond to a vehicle including a display. If the vehicle is moving, the shortlister component 550 may decrease the confidence score associated with a domain that generates video data as it may be undesirable to output video content to a user while the user is driving. The device may output data to the system(s) 120 indicating when the device is moving.

The other data 620 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 550 may use such data to alter confidence scores of domains. For example, the shortlister component 550 may run a first model specific to a first domain as well as a second model specific to a second domain. Alternatively, the shortlister component 550 may run a model configured to determine a score for each domain. The shortlister component 550 may also determine a same confidence score for each of the domains in the first instance. The shortlister component 550 may then alter the original confidence scores based on the first domain being invoked to cause the system to output content while the current user input was received. Based on the first domain being invoked, the shortlister component 550 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 615 generated by the shortlister component 550 as well as the different types of other data 620 considered by the shortlister component 550 are configurable. For example, the shortlister component 550 may update confidence scores as more other data 620 is considered. For further example, the n-best list data 615 may exclude relevant domains if thresholding is implemented. Thus, for example, the shortlister component 550 may include an indication of a domain in the n-best list 615 unless the shortlister component 550 is one hundred percent confident that the domain may not execute the user input represented in the ASR output data 610 (e.g., the shortlister component 550 determines a confidence score of zero for the domain).

The shortlister component 550 may send the ASR output data 610 to recognizers 563 associated with domains represented in the n-best list data 615. Alternatively, the shortlister component 550 may send the n-best list data 615 or some other indicator of the selected subset of domains to another component (such as the orchestrator component 230) which may in turn send the ASR output data 610 to the recognizers 563 corresponding to the domains included in the n-best list data 615 or otherwise indicated in the indicator. If the shortlister component 550 generates an n-best list representing domains without any associated confidence scores, the shortlister component 550/orchestrator component 230 may send the ASR output data 610 to recognizers 563 associated with domains that the shortlister component 550 determines may execute the user input. If the shortlister component 550 generates an n-best list representing domains with associated confidence scores, the shortlister component 550/orchestrator component 230 may send the ASR output data 610 to recognizers 563 associated with domains associated with confidence scores satisfying (e.g., meeting or exceeding) a threshold minimum confidence score.

A recognizer 563 may output tagged text data generated by an NER component 562 and an IC component 564, as described herein above. The NLU component 260 may compile the output tagged text data of the recognizers 563 into a single cross-domain n-best list 640 and may send the cross-domain n-best list 640 to a pruning component 650. Each entry of tagged text (e.g., each NLU hypothesis) represented in the cross-domain n-best list data 640 may be associated with a respective score indicating a likelihood that the NLU hypothesis corresponds to the domain associated with the recognizer 563 from which the NLU hypothesis was output. For example, the cross-domain n-best list data 640 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 650 may sort the NLU hypotheses represented in the cross-domain n-best list data 640 according to their respective scores. The pruning component 650 may perform score thresholding with respect to the cross-domain NLU hypotheses. For example, the pruning component 650 may select NLU hypotheses associated with scores satisfying (e.g., meeting and/or exceeding) a threshold score. The pruning component 650 may also or alternatively perform number of NLU hypothesis thresholding. For example, the pruning component 650 may select the top scoring NLU hypothesis(es). The pruning component 650 may output a portion of the NLU hypotheses input thereto. The purpose of the pruning component 650 is to create a reduced list of NLU hypotheses so that downstream, more resource intensive, processes may only operate on the NLU hypotheses that most likely represent the user's intent.

The NLU component 260 may include a light slot filler component 652. The light slot filler component 652 can take text from slots represented in the NLU hypotheses output by the pruning component 650 and alter them to make the text more easily processed by downstream components. The light slot filler component 652 may perform low latency operations that do not involve heavy operations such as reference to a knowledge base (e.g., 572. The purpose of the light slot filler component 652 is to replace words with other words or values that may be more easily understood by downstream components. For example, if a NLU hypothesis includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words are then included in the cross-domain n-best list data 660.

The cross-domain n-best list data 660 may be input to an entity resolution component 670. The entity resolution component 670 can apply rules or other instructions to standardize labels or tokens from previous stages into an intent/slot representation. The precise transformation may depend on the domain. For example, for a travel domain, the entity resolution component 670 may transform text corresponding to "Boston airport" to the standard BOS three-letter code referring to the airport. The entity resolution component 670 can refer to a knowledge base (e.g., 572) that is used to specifically identify the precise entity referred to in each slot of each NLU hypothesis represented in the cross-domain n-best list data 660. Specific intent/slot combinations may also be tied to a particular source, which may then be used to resolve the text. In the example "play songs by the stones," the entity resolution component 670 may reference a personal music catalog, Amazon Music account, a user profile, or the like. The entity resolution component 670 may output an altered n-best list that is based on the cross-domain n-best list 660 but that includes more detailed information (e.g., entity IDs) about the specific entities mentioned in the slots and/or more detailed slot data that can eventually be used by a skill. The NLU component 260 may include multiple entity resolution components 670 and each entity resolution component 670 may be specific to one or more domains.

The NLU component 260 may include a reranker 690. The reranker 690 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 670.

The reranker 690 may apply re-scoring, biasing, or other techniques. The reranker 690 may consider not only the data output by the entity resolution component 670, but may also consider other data 691. The other data 691 may include a variety of information. For example, the other data 691 may include skill rating or popularity data. For example, if one skill has a high rating, the reranker 690 may increase the score of a NLU hypothesis that may be processed by the skill. The other data 691 may also include information about skills that have been enabled by the user that originated the user input. For example, the reranker 690 may assign higher scores to NLU hypothesis that may be processed by enabled skills than NLU hypothesis that may be processed by non-enabled skills. The other data 691 may also include data indicating user usage history, such as if the user that originated the user input regularly uses a particular skill or does so at particular times of day. The other data 691 may additionally include data indicating date, time, location, weather, type of device 110, user identifier, context, as well as other information. For example, the reranker 690 may consider when any particular skill is currently active (e.g., music being played, a game being played, etc.).

As illustrated and described, the entity resolution component 670 is implemented prior to the reranker 690. The entity resolution component 670 may alternatively be implemented after the reranker 690. Implementing the entity resolution component 670 after the reranker 690 limits the NLU hypotheses processed by the entity resolution component 670 to only those hypotheses that successfully pass through the reranker 690.

The reranker 690 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2). The NLU component 260 may separately perform NLU processing described above with respect to domains associated with skills that are at least partially implemented as part of the skill system(s) 125. In an example, the shortlister component 550 may only process with respect to these latter domains. Results of these two NLU processing paths may be merged into NLU output data 685, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 685, skill result data 630, and the other data 620 in order to output ranked output data 625. The ranked output data 625 may include an n-best list where the NLU hypotheses in the NLU results data 685 are reordered such that the n-best list in the ranked output data 625 represents a prioritized list of skills to respond to a user input as determined by the post-NLU ranker 265. The ranked output data 625 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 685 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 630 based on the first NLU hypothesis and the second NLU hypothesis, respectively. For example, the post-NLU ranker 265 may send the first NLU hypothesis to the first skill 290*a* along with a request for the first skill 290*a* to at least partially execute with respect to the first NLU hypothesis. The post-NLU ranker 265 may also send the second NLU hypothesis to the second skill 290*b* along with a request for the second skill 290*b* to at least partially execute with respect to the second NLU hypothesis. The post-NLU ranker 265 receives, from the first skill 290*a*, first result data 630*a* generated from the first skill 290*a*'s execution with respect to the first NLU hypothesis. The post-NLU ranker 265 also receives, from the second skill 290*b*, second results data 630*b* generated from the second skill 290*b*'s execution with respect to the second NLU hypothesis.

The result data 630 may include various portions. For example, the result data 630 may include content (e.g., audio data, text data, and/or video data) to be output to a user. The result data 630 may also include a unique identifier used by the system(s) 120 and/or the skill system(s) 125 to locate the data to be output to a user. The result data 630 may also include an instruction. For example, if the user input corresponds to "turn on the light," the result data 630 may include an instruction causing the system to turn on a light associated with a profile of the device (110*a*/110*b*) and/or user.

The post-NLU ranker 265 may consider the first result data 630*a* and the second result data 630*b* to alter the first confidence score and the second confidence score of the first NLU hypothesis and the second NLU hypothesis, respectively. That is, the post-NLU ranker 265 may generate a third confidence score based on the first result data 630*a* and the first confidence score. The third confidence score may correspond to how likely the post-NLU ranker 265 determines the first skill will correctly respond to the user input. The post-NLU ranker 265 may also generate a fourth confidence score based on the second result data 630*b* and the second confidence score. One skilled in the art will appreciate that a first difference between the third confidence score and the fourth confidence score may be greater than a second difference between the first confidence score and the second confidence score. The post-NLU ranker 265 may also consider the other data 620 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 630 associated with the skill 290 with the highest altered confidence score to be the data output in response to the current user input. The post-NLU ranker 265 may also consider the ASR output data 610 to alter the NLU hypotheses confidence scores.

The orchestrator component 230 may, prior to sending the NLU results data 685 to the post-NLU ranker 265, associate intents in the NLU hypotheses with skills 290. For example, if a NLU hypothesis includes a < PlayMusic> intent, the orchestrator component 230 may associate the NLU hypothesis with one or more skills 290 that can execute the <PlayMusic> intent. Thus, the orchestrator component 230 may send the NLU results data 685, including NLU hypotheses paired with skills 290, to the post-NLU ranker 265. In response to ASR output data 610 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 290, paired with a NLU hypothesis in the NLU output data 685, to provide result data 630 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 630. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 630 indicating slots of a framework that the skill 290 further needs filled or entities that the skill 290 further needs resolved prior to the skill 290 being able to provided result data 630 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 630 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 630 provided by the skills 290 to alter the NLU processing confidence scores generated by the reranker 690. That is, the post-NLU ranker 265 uses the result data 630 provided by the queried skills 290 to create larger differences between the NLU processing confidence scores generated by the reranker 690. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 630 responsive to NLU hypotheses over skills 290 that provide result data 630 corresponding to an indication that further information is needed, as well as skills 290 that provide result data 630 indicating they can provide multiple responses to received NLU hypotheses. For example, the post-NLU ranker 265 may generate a first score for a first skill 290a that is greater than the first skill's NLU confidence score based on the first skill 290a providing result data 630a including a response to a NLU hypothesis. For further example, the post-NLU ranker 265 may generate a second score for a second skill 290b that is less than the second skill's NLU confidence score based on the second skill 290b providing result data 630b indicating further information is needed for the second skill 290b to provide a response to a NLU hypothesis. Yet further, for example, the post-NLU ranker 265 may generate a third score for a third skill 290c that is less than the third skill's NLU confidence score based on the third skill 290c providing result data 630c indicating the third skill 290c can provide multiple responses to a NLU hypothesis.

The post-NLU ranker 265 may consider other data 620 in determining scores. The other data 620 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290a that is greater than the first skill's NLU processing confidence score based on the first skill 290a being associated with a high ranking. For further example, the post-NLU ranker 265 may generate a second score for a second skill 290b that is less than the second skill's NLU processing confidence score based on the second skill 290b being associated with a low ranking.

The other data 620 may include information indicating whether or not the user that originated the user input has enabled one or more of the queried skills 290. For example, the post-NLU ranker 265 may generate a first score for a first skill 290a that is greater than the first skill's NLU processing confidence score based on the first skill 290a being enabled by the user that originated the user input. For further example, the post-NLU ranker 265 may generate a second score for a second skill 290b that is less than the second skill's NLU processing confidence score based on the second skill 290b not being enabled by the user that originated the user input. When the post-NLU ranker 265 receives the NLU results data 685, the post-NLU ranker 265 may determine whether profile data, associated with the user and/or device that originated the user input, includes indications of enabled skills.

The other data 620 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 620 may include information indicating the veracity of the result data 630 provided by a skill 290. For example, if a user says "tell me a recipe for pasta sauce," a first skill 290a may provide the post-NLU ranker 265 with first result data 630a corresponding to a first recipe associated with a five star rating and a second skill 290b may provide the post-NLU ranker 265 with second result data 630b corresponding to a second recipe associated with a one star rating. In this situation, the post-NLU ranker 265 may increase the NLU processing confidence score associated with the first skill 290a based on the first skill 290a providing the first result data 630a associated with the five star rating and/or decrease the NLU processing confidence score associated with the second skill 290b based on the second skill 290b providing the second result data 630b associated with the one star rating.

The other data 620 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290a corresponding to a room service skill associated with the hotel and/or decrease the NLU processing confidence score associated with a second skill 290b corresponding to a food skill not associated with the hotel.

The other data 620 may include information indicating a location of the device and/or user that originated the user input. The system may be configured with skills 290 that may only operate with respect to certain geographic locations. For example, a user may provide a user input corresponding to "when is the next train to Portland." A first skill 290a may operate with respect to trains that arrive at, depart from, and pass through Portland, Oreg. A second skill 290b may operate with respect to trains that arrive at, depart from, and pass through Portland, Maine. If the device and/or user that originated the user input is located in Seattle, Wash., the post-NLU ranker 265 may increase the NLU processing confidence score associated with the first skill 290a and/or decrease the NLU processing confidence score associated with the second skill 290b. Likewise, if the device and/or user that originated the user input is located in Boston, Mass., the post-NLU ranker 265 may increase the NLU processing confidence score associated with the second skill 290b and/or decrease the NLU processing confidence score associated with the first skill 290a.

The other data 620 may include information indicating a time of day. The system may be configured with skills 290 that operate with respect to certain times of day. For example, a user may provide a user input corresponding to "order me food." A first skill 290a may generate first result data 630a corresponding to breakfast. A second skill 290b may generate second result data 630b corresponding to dinner. If the system(s) 120 receives the user input in the morning, the post-NLU ranker 265 may increase the NLU processing confidence score associated with the first skill 290a and/or decrease the NLU processing score associated with the second skill 290b. If the system(s) 120 receives the user input in the afternoon or evening, the post-NLU ranker 265 may increase the NLU processing confidence score associated with the second skill 290b and/or decrease the NLU processing confidence score associated with the first skill 290a.

The other data 620 may include information indicating user preferences. The system may include multiple skills 290 configured to execute in substantially the same manner. For example, a first skill 290a and a second skill 290b may both be configured to order food from respective restaurants. The system may store a user preference (e.g., in the profile storage 270) that is associated with the user that provided the user input to the system(s) 120 as well as indicates the user prefers the first skill 290a over the second skill 290b. Thus, when the user provides a user input that may be executed by both the first skill 290a and the second skill 290b, the post-NLU ranker 265 may increase the NLU processing confidence score associated with the first skill 290a and/or decrease the NLU processing confidence score associated with the second skill 290b.

The other data 620 may include information indicating system usage history associated with the user that originated the user input. For example, the system usage history may indicate the user originates user inputs that invoke a first skill 290a more often than the user originates user inputs that invoke a second skill 290b. Based on this, if the present user input may be executed by both the first skill 290a and the second skill 290b, the post-NLU ranker 265 may increase the NLU processing confidence score associated with the first skill 290a and/or decrease the NLU processing confidence score associated with the second skill 290b.

The other data 620 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290a that generates audio data. The post-NLU ranker 265 may also or alternatively decrease the NLU processing confidence score associated with a second skill 290b that generates image data or video data.

The other data 620 may include information indicating how long it took a skill 290 to provide result data 630 to the post-NLU ranker 265. When the post-NLU ranker 265 multiple skills 290 for result data 630, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 620 to increase and decrease NLU processing confidence scores associated with various skills 290 that the post-NLU ranker 265 has already requested result data from. Alternatively, the post-NLU ranker 265 may use the other data 620 to determine which skills 290 to request result data from. For example, the post-NLU ranker 265 may use the other data 620 to increase and/or decrease NLU processing confidence scores associated with skills 290 associated with the NLU results data 685 output by the NLU component 260. The post-NLU ranker 265 may select n-number of top scoring altered NLU processing confidence scores. The post-NLU ranker 265 may then request result data 630 from only the skills 290 associated with the selected n-number of NLU processing confidence scores.

As described, the post-NLU ranker 265 may request result data 630 from all skills 290 associated with the NLU results data 685 output by the NLU component 260. Alternatively, the system(s) 120 may prefer result data 630 from skills implemented entirely by the system(s) 120 rather than skills at least partially implemented by the skill system(s) 125. Therefore, in the first instance, the post-NLU ranker 265 may request result data 630 from only skills associated with the NLU results data 685 and entirely implemented by the system(s) 120. The post-NLU ranker 265 may only request result data 630 from skills associated with the NLU results data 685, and at least partially implemented by the skill system(s) 125, if none of the skills, wholly implemented by the system(s) 120, provide the post-NLU ranker 265 with result data 630 indicating either data response to the NLU results data 685, an indication that the skill can execute the user input, or an indication that further information is needed.

As indicated above, the post-NLU ranker 265 may request result data 630 from multiple skills 290. If one of the skills 290 provides result data 630 indicating a response to a NLU hypothesis and the other skills provide result data 630 indicating either they cannot execute or they need further information, the post-NLU ranker 265 may select the result data 630 including the response to the NLU hypothesis as the data to be output to the user. If more than one of the skills 290 provides result data 630 indicating responses to NLU hypotheses, the post-NLU ranker 265 may consider the other data 620 to generate altered NLU processing confidence scores, and select the result data 630 of the skill associated with the greatest score as the data to be output to the user.

A system that does not implement the post-NLU ranker 265 may select the highest scored NLU hypothesis in the NLU results data 685. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 685 to provide result data 630 to the post-NLU ranker 265 prior to the post-NLU ranker 265 ultimately determining the skill 290 to be invoked to respond to the user input. Some of the skills 290 may provide result data 630 indicating responses to NLU hypotheses while other skills 290 may providing result data 630 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 630, associated with the skill 290 associated with the highest score, for output to the user. Alternatively, the post-NLU ranker 265 may output ranked output data 625 indicating skills 290 and their respective post-NLU ranker rankings. Since the post-NLU ranker 265 receives result data 630, potentially corresponding to a response to the user input, from the skills 290 prior to post-NLU ranker 265 selecting one of the skills or outputting the ranked output data 625, little to no latency occurs from the time skills provide result data 630 and the time the system outputs responds to the user.

If the post-NLU ranker 265 selects result audio data to be output to a user and the system determines content should be output audibly, the post-NLU ranker 265 (or another component of the system(s) 120) may cause the device 110a and/or the device 110b to output audio corresponding to the result audio data. If the post-NLU ranker 265 selects result text data to output to a user and the system determines content should be output visually, the post-NLU ranker 265 (or another component of the system(s) 120) may cause the device 110b to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110b to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the device 110a and/or the device 110b to output audio corresponding to the output audio data.

As described, a skill 290 may provide result data 630 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 630 indicating a response to the user input, the post-NLU ranker 265 (or another component of the system(s) 120, such as the orchestrator component 230) may simply cause content corresponding to the result data 630 to be output to the user. For example, the post-NLU ranker 265 may send the result data 630 to the orchestrator component 230. The orchestrator component 230 may cause the result data 630 to be sent to the device (110a/110b), which may output audio and/or display text corresponding to the result data 630. The orchestrator component 230 may send the result data 630 to the ASR component 250 to generate output text data and/or may send the result data 630 to the TTS component 280 to generate output audio data, depending on the situation.

The skill 290 associated with the highest post-NLU ranker score may provide the post-NLU ranker 265 with result data 630 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 265 may simply cause the received instruction data be output by the device (110a/110b). Alternatively, the instruction data may be in a format that is not capable of being output by the device (110a/110b). When this occurs, the post-NLU ranker 265 may cause the ASR component 250 or the TTS component 280 to process the instruction data, depending on the situation, to generate instruction data that may be output by the device (110a/110b). Once the user provides the system with all further information needed by the skill 290, the skill 290 may provide the system with result data 630 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 630 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 630, the system may further engage a transactional skill 290 after the transactional skill 290 provides the post-NLU ranker 265 with result data 630 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 7:
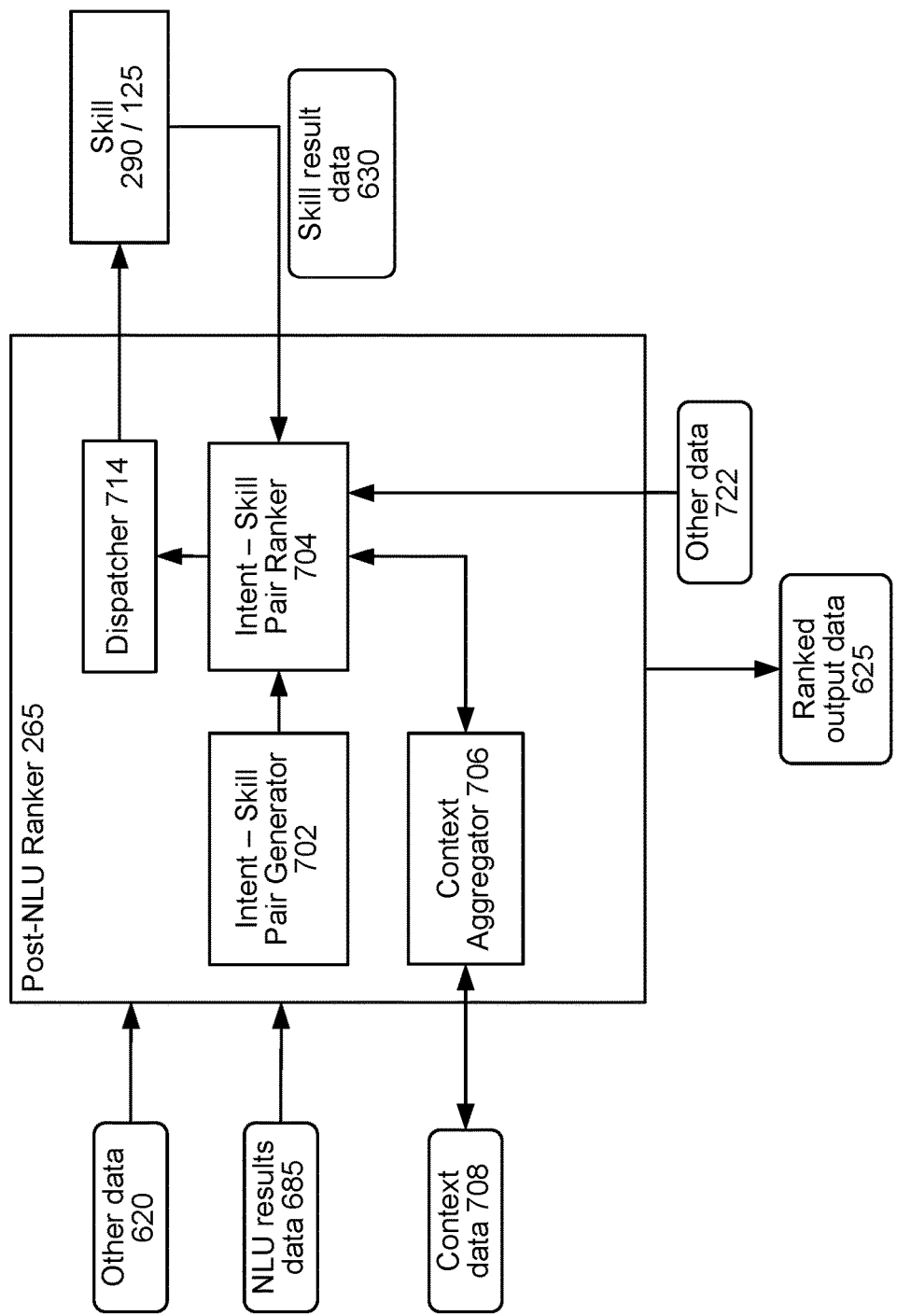
FIG. 7 is a conceptual diagram illustrating how a post-NLU ranker may process according to embodiments of the present disclosure.

FIG. 7 illustrates other configurations and operations of the post-NLU ranker 265. When the post-NLU ranker 265 receives NLU results data 685, the NLU results data 685 may be sent to an intent-skill pair generator 702. The intent-skill pair generator 702 may include information about what skills are capable of handling what intents. Such information may be context agnostic, and may thus indicate what skills are capable of handling what intents generally, without regard to the context associated with the user input. The intent-skill pair generator 702 thus receives the NLU results data 685 and identifies what particular candidate skills may handle the intent for NLU hypothesis. For example, if a NLU hypothesis includes a particular intent, the intent-skill pair generator 702 identifies each skill that may execute with respect to the intent. For further example, if the NLU results data 685 include multiple NLU hypotheses including multiple intents, the intent-skill pair generator 702 associates each different NLU hypothesis with each skill that may execute with respect to the NLU hypothesis. As illustrated, the intent-skill pair generator 702 may be implemented at part of the post-NLU ranker 265. However, one skill in the art will appreciate that the intent-skill pair generator 702 may be implemented as part of the NLU component 260 or in another component without departing from the present disclosure. In such a case, the NLU results data 685 may include intent-skill pairs.

The post-NLU ranker 265 may also include an intent-skill pair ranker 704. The intent-skill pair ranker 704 ranks the intent-skill pairs generated by the intent-skill pair generator 702 based on, for example, the number of filled slots of a NLU hypothesis, an NLU confidence score associated with a NLU hypothesis, context information output by a context aggregator 706, and/or other data.

The post-NLU ranker 265 may include the context aggregator 706. The context aggregator 706 receives context data 708 from various contextual sources. The context data 708 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 706 may aggregate the context data 708 and put the context data 708 in a form that can be processed by the intent-skill pair ranker 704. Context data 708 may include data obtained from the device 110 or from other services connected to the system(s) 120.

The context data 708 may include skill availability data. Such information may indicate what skills are available and authorized to process the user input. For example, if the user has only enabled certain skills, the enabled skills may be noted in the skill availability data.

The context data 708 may also include dialogue data. A "dialogue" or "dialogue session" as used herein may refer to data transmissions (such as relating to multiple user inputs and system(s) 120 outputs) between the system(s) 120 and a local device (e.g., the device 110) that all relate to a single originating user input. Thus, the data transmissions of a dialogue session may share a dialogue identifier or other unique identifier that may be used by the orchestrator component 230, skill(s) 290, skill server(s) 125, etc. to track information across the dialogue session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialogue session related to the originating user input "play jeopardy." In some examples, a dialogue-initiating user input may start with a wakeword and end with a command, such as "Alexa, play jeopardy," where "Alexa" is the wakeword and "play jeopardy" is the command. Subsequent user inputs of the same dialogue session may or may not start with speaking of a wakeword. Each user input of a dialogue may be associated with a unique user input identifier such that multiple user input identifiers may be associated with a single dialogue session identifier.

Dialogue data may include interactive focus information, (e.g., representing which skill was most recently invoked to execute a previous user input for the user and/or device 110 associated with the present user input). Dialogue data may also include content focus information (e.g., representing a skill that is streaming data to the device 110 when the data corresponding to the current user input is received by the system(s) 120). The context data 708 may be one portion of the data used by the intent-skill pair ranker 704 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 708 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 708 (and/or other data 722) may include a metadata flag/indicator that represents whether the particular skill being executed is one that can handle a go-back (or other navigational) request.

The context data 708 may also include user profile data. The user profile data may represent preferences and/or characteristics of the user that originated the current user input. Such data may be received from the profile storage 270.

The context data 708 may also include location data. The location data may represent a location of the device 110 from which the user input was received.

The context data 708 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

For example, while interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the user may expect the system to provide the hours (or the closing time) of the Starbucks that was just part of an exchange between the user and the system. In another example, after asking the system to "play Beethoven's $5^{th}$ Symphony" the user may ask the system "when did he write that?" In order to answer the second query, the system must understand that "he" refers to Beethoven and "that" refers to the musical work $5^{th}$ Symphony. Words that refer to an entity but do not explicitly name the entity are an example of anaphora, namely a word referring to or replacing another word.

Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, while a language such as English may use unknown words to substitute for anaphora/(e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages.

The context data 708 may also include data regarding whether one or more skills are "in focus." A skill may be in interactive focus, meaning the skill was the most recent skill that executed a user input for a user or device associated with a present user input and/or the skill may be involved with an open dialogue (e.g., series of user inputs and responses) with a user device. Interactive focus attempts to continue a conversation between a user and the system and/or a skill for purposes of processing the dialogue. However, there may be instances where a user inputs a command that may be handled by a skill that is currently in interactive focus, but which the user does not intend to be executed by such skill. The system may process the context data 708 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 708 may also include other context data not explicitly recited herein.

The intent-skill pair ranker 704 may operate one or more trained models that are configured to process the NLU results data 685, skill result data 630, and other data 722 in order to determine a single best skill for executing the current user input from the available pairs output by the intent-skill pair generator 702. The intent-skill pair ranker 704 may send queries to the skills and request a first skill and a second skill (for example the candidate skills identified by the pair generator 702), to provide potential result data indicating whether the skill can handle the intent at the particular moment and if so, what the output data for the particular skill would be (e.g., data the skill would provide to a user if the skill were selected to execute the user input) based on the NLU results data 685. For example, the intent-skill pair ranker 704 may send a first NLU hypothesis, associated with a first skill, to the first skill along with a request for the first skill to at least partially execute with respect to the first NLU hypothesis. The intent-skill pair ranker 704 may also send a second NLU hypothesis, associated with the second skill, to the second skill along with a request for the second skill to at least partially execute with respect to the second NLU hypothesis. The intent-skill pair ranker 704 receives, from the first skill, first result data 630*a* generated from the first skill's execution with respect to the first NLU hypothesis. The intent-skill pair ranker 704 also receives, from the second skill, second results data 630*b* generated from the second skill's execution with respect to the second NLU hypothesis. Based on the first results data 630*a*, a first NLU confidence score associated with the first NLU hypothesis, the second results data 630*b*, a second NLU confidence score associated with the second NLU hypothesis, and other data 722 (e.g., context data, user profile data, etc.), the intent-skill pair ranker 704 determines the best skill for executing the current user input. The intent-skill pair ranker 704 sends an indication of the best skill to a dispatcher component 714.

The dispatcher 714 may then send the selected skill the information needed to execute the user input, including an indication of the intent, the appropriate context data 708 (such as device identifier, user identifier, or the like), slot data, utterance identifier, dialogue identifier, or any other information needed.

One or more models implemented by components of the orchestrator component 230, post-NLU ranker 265, shortlister 550, or other component may be trained and operated according to various machine learning techniques.

The device 110 and/or the system(s) 120 may include a user recognition component 295 that recognizes one or more users using a variety of data. As illustrated in FIG. 8, the user recognition component 295 may include one or more sub-components including a vision component 808, an audio component 810, a biometric component 812, a radio frequency (RF) component 814, a machine learning (ML)

component 816, and a recognition confidence component 818. In some instances, the user recognition component 295 may monitor data and determinations from one or more subcomponents to determine an identity of one or more users associated with data input to the device 110 and/or the system(s) 120. The user recognition component 295 may output user recognition data 895, which may include a user identifier associated with a user the user recognition component 295 determines originated data input to the device 110 and/or the system(s) 120. The user recognition data 895 may be used to inform processes performed by various components of the device 110 and/or the system(s) 120.

The vision component 808 may receive data from one or more sensors capable of providing images (e.g., cameras) or sensors indicating motion (e.g., motion sensors). The vision component 808 can perform facial recognition or image analysis to determine an identity of a user and to associate that identity with a user profile associated with the user. In some instances, when a user is facing a camera, the vision component 808 may perform facial recognition and identify the user with a high degree of confidence. In other instances, the vision component 808 may have a low degree of confidence of an identity of a user, and the user recognition component 295 may utilize determinations from additional components to determine an identity of a user. The vision component 808 can be used in conjunction with other components to determine an identity of a user. For example, the user recognition component 295 may use data from the vision component 808 with data from the audio component 810 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 812. For example, the biometric component 812 may receive data corresponding to fingerprints, iris or retina scans, thermal scans, weights of users, a size of a user, pressure (e.g., within floor sensors), etc., and may determine a biometric profile corresponding to a user. The biometric component 812 may distinguish between a user and sound from a television, for example. Thus, the biometric component 812 may incorporate biometric information into a confidence level for determining an identity of a user. Biometric information output by the biometric component 812 can be associated with specific user profile data such that the biometric information uniquely identifies a user profile of a user.

The radio frequency (RF) component 814 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 814 the strength of the signal (e.g., as a received signal strength indication (RSSI)). The RF component 814 may use the RSSI to determine an identity of a user (with an associated confidence level). In some instances, the RF component 814 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 816 may track the behavior of various users as a factor in determining a confidence level of the identity of the user. By way of example, a user may adhere to a regular schedule such that the user is at a first location during the day (e.g., at work or at school). In this example, the ML component 816 would factor in past behavior and/or trends in determining the identity of the user that provided input to the device 110 and/or the system(s) 120. Thus, the ML component 816 may use historical data and/or usage patterns over time to increase or decrease a confidence level of an identity of a user.

In at least some instances, the recognition confidence component 818 receives determinations from the various components 808, 810, 812, 814, and 816, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 895.

The audio component 810 may receive data from one or more sensors capable of providing an audio signal (e.g., one or more microphones) to facilitate recognition of a user. The audio component 810 may perform audio recognition on an audio signal to determine an identity of the user and associated user identifier. In some instances, aspects of device 110 and/or the system(s) 120 may be configured at a computing device (e.g., a local server). Thus, in some instances, the audio component 810 operating on a computing device may analyze all sound to facilitate recognition of a user. In some instances, the audio component 810 may perform voice recognition to determine an identity of a user.

The audio component 810 may also perform user identification based on audio data 211 input into the device 110 and/or the system(s) 120 for speech processing. The audio component 810 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 810 may perform user recognition by comparing speech characteristics represented in the audio data 211 to stored speech characteristics of users (e.g., stored voice profiles associated with the device 110 that captured the spoken user input).

FIG. 9 is a conceptual diagram illustrating sentiment detection component 275 according to embodiments of the present disclosure. The sentiment detection component 275 may determine a user sentiment based on audio data 211, image data 211, and other data. Although certain configurations/operations of the sentiment detection component 275 are illustrated in FIG. 9 and described herein, other techniques/configurations of sentiment detection may be used depending on system configuration.

The sentiment detection component 275 may include a voice activity detection (VAD) component 905, a user identification component 910, an encoder component 920, a modality attention layer 935, a trained model component 940, an utterance attention layer 945, and a trained model component 965. The audio data 211 captured by a device 110 may be inputted into the VAD component 905. The VAD component 905 may determine if the audio data 211 includes speech spoken by a human or voice activity by a human, and may determine a portion of the audio data 211 that includes speech or voice activity. The VAD component 905 may send the portion of the audio data 211 including speech or voice activity to the user identification component 910. The VAD component 905 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 905 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user identification component 910 may communicate with the user recognition component 295 to determine user audio data 915 that corresponds to a particular user profile. The user recognition component 295 may recognize one or more users as described in connection with FIG. 8. The user audio data 915 may be a portion of the audio data 211 that includes speech or one or more utterances from a particular user associated with the user profile. In other words, audio data representing a particular user's speech may be isolated and stored as the user audio data 915 for further analysis. In an example embodiment, the user may be associated with or using the device 110, and may have provided permission to the system 100 to record and analyze his or her voice/ conversations to determine a sentiment category corresponding to the conversation.

The user audio data 915 may be input into the encoder component 920 to determine frame feature vector(s) 925. The encoder component 920 may be a bidirectional LSTM. The frame feature vector(s) 925 may represent audio frame level features extracted from the user audio data 915. One frame feature vector 925 may represent audio frame level features for an audio frame of 20 ms of the user audio data 915. The frame feature vector(s) 925 may be derived by spectral analysis of the user audio data 915. The sentiment detection component 275 may determine the portions of user audio data 915 that correspond to individual words and may extract acoustic features from the respective portions of audio using the encoder component 920.

In some embodiments, the frame feature vector(s) 925 may be used to determine utterance feature vector(s) 960 representing utterance-level features of one or more utterances represented in the user audio data 915. The utterance feature vector(s) 960 may be determined by performing statistics calculations, delta calculation and other processing on the frame feature vector(s) 925 for the audio frames corresponding to an utterance of interest. As such, the utterance feature vector(s) 960 may be a feature matrix whose dimensions are based on the number of audio frames corresponding to the utterance of interest and the dimension of the corresponding frame feature vector 925. The utterance feature vector(s) 960 may be a high-level function or other mathematical functions representing the utterance-level features.

The ASR component 250, as described above, may generate ASR output data, for example including text data representative of one or more utterances represented in the audio data 211. In some examples, the system sends audio data 211 to the ASR component 250 for processing. In other examples, the system sends user audio data 915 to the ASR component 250 for processing. The ASR output may be represented as word feature vector(s) 930, where each word feature vector 930 may correspond to a word in the text data determined by the ASR component 250 and may represent lexical information of the utterance. The word feature vector 930 may be a word embedding.

In an example embodiment, the sentiment detection component 275 determines that the user audio data 915 includes an entire utterance. That is, the sentiment detection component 275 may determine that a beginpoint of the user audio data 915 corresponds to a beginpoint of an utterance, and an endpoint of the user audio data 915 corresponds to an endpoint of the utterance. In this case, the frame feature vector(s) 925 and the word feature vector(s) 930 may represent all the words in one utterance.

The sentiment detection component 275 may also input image data 211 which may come from still images, an image feed of video data, or the like for example from one or more cameras of device 110 or otherwise. The image data 211 may include a representation of a user which the system may analyze to determine the user's sentiment. Image data 211 may be processed by an encoder (not illustrated) to determine image feature vector(s) 927. Such an encoder may be included as part of sentiment detection component 275 or may be located separately, in which case image feature vector(s) 927 may be input into sentiment detection component 275 in addition to or instead of image data 211. The image data/feature vectors may be analyzed separately by sentiment detection component 275 if audio data/ASR data is unavailable. The image data/feature vectors may also be analyzed in conjunction with the audio data/ASR output data.

The sentiment detection component 275 may align a frame feature vector 925 with a corresponding word feature vector 930 such that the pair represents acoustic information and lexical information, respectively, for an individual word in the utterance represented in user audio data 915. The sentiment detection component 275 may similarly align one or more image feature vector(s) 927 with one or more frame feature vector(s) 925 and/or corresponding word feature vector(s) 930 so the appropriate image(s) are matched with the frames/ASR output data thus allowing the system to consider the audio, content and image of the user talking when performing sentiment analysis. The frame feature vectors 925, image feature vector(s) 927, and the word feature vectors 930 may be processed by the trained model 940 simultaneously.

The trained model 940 may process the frame feature vector(s) 925 and corresponding word feature vector(s) 930 using a machine learning model. In some embodiments, the sentiment detection component 275 includes a modality attention component 935 configured to determine how much acoustic information versus how much lexical information versus how much image information from the respective feature vectors 925/927/930 should be used by the trained model 940. In some cases the acoustic information corresponding to certain words may indicate a certain sentiment based on how the words were spoken by the user. In other cases the lexical information corresponding to certain words may indicate a certain sentiment based on the meaning or semantic of the word. For example, words "hey you" spoken with a certain level of anger, as indicated by the corresponding acoustic information, may indicate a sentiment category of anger, while the same words "hey you" spoken with no level of anger or excitement, as indicated by the corresponding acoustic information, may indicate a sentiment category of neutral. As a lexical example, the words "I am angry" may indicate a sentiment category of anger based on the corresponding lexical information. The modality attention component 935 may assign a weight or percentage to the data represented by the acoustic feature vectors, the data represented by the image feature vectors, and the data represented by the lexical feature vectors to indicate the importance of each to the trained model 940.

The trained model 940 may be a neural network, for example a bi-directional LSTM. The output of the trained model 940 may be fed into an utterance attention component 945. The utterance attention component 945 may employ a neural network, for example a recurrent neural network, although the disclosure is not limited thereto. The utterance attention component 945 may be configured to emphasize relevant portions of an input utterance. The utterance attention component 945 may be configured to take in output data from the trained model 940 and produce an output for every time step (e.g., a 10 ms audio frame). The utterance attention component 945 may be configured to aggregate information from different time intervals/audio frames of the input audio data to determine how certain parts of the utterance affects determining of the sentiment. For example, an acoustic representation of a first word in the utterance may indicate a high arousal implying anger, in which case the utterance attention component 945 is configured to realize that the first word corresponds to an anger sentiment and that that should affect the processing of the other words in the utterance to ultimately determine a sentiment category corresponding to the utterance.

The utterance attention component 945 may output score(s) 950 indicating a sentiment category 955 for the user audio data 915. The sentiment detection component 275 may predict from multiple sentiment categories, including but not limited to, happiness, sadness, anger and neutral. In an example embodiment, the sentiment category 955 may be determined after score(s) 950 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 275 is configured to determine a sentiment category 975 at an utterance-level. The sentiment detection component 275 may use contextual information from the entire utterance to determine an overall sentiment of the speaker when speaking the utterance. The sentiment detection component 275 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 275 may be configured to determine a sentiment category on a word level (that is for each word within an utterance).

As illustrated in FIG. 9, the trained model component 965 may process the utterance feature vector(s) 960 using a fully-connected neural network trained using techniques known to one of skill in the art. The trained model component 965 may output score(s) 970 indicating a sentiment category 975 for the user audio data 915.

The sentiment detection component 275 may predict one of three sentiment categories 955/975. In some examples, the sentiment categories 955/975 may be positive, neutral, and negative. However, the disclosure is not limited thereto, and in other examples the sentiment categories 955/975 may be angry, neutral (e.g., neutral/sad), and happy without departing from the disclosure. Additionally or alternatively, the sentiment detection component 275 may predict any number of sentiment categories 955/975 without departing from the disclosure. For example, the sentiment detection component 275 may predict one of four sentiment categories 955/975, such as angry, sad, neutral, and happy, although the disclosure is not limited thereto.

The machine learning model for the trained model component 940/965 may take many forms, including a neural network. The trained model component 940/965 may employ a convolutional neural network and/or may employ a fully-connected neural network. In some examples, a neural network may include a number of layers, from input layer 1 through output layer N. Each layer is configured to output a particular type of data and output another type of data. Thus, a neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from a penultimate layer.

While values for the input data/output data of a particular layer are not known until a neural network is actually operating during runtime, the data describing the neural network describes the structure and operations of the layers of the neural network.

In some examples, a neural network may be structured with an input layer, middle layer(s), and an output layer. The middle layer(s) may also be known as the hidden layer(s). Each node of the hidden layer is connected to each node in the input layer and each node in the output layer. In some examples, a neural network may include a single hidden layer, although the disclosure is not limited thereto and the neural network may include multiple middle layers without departing from the disclosure. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. For example, each node of the input layer may connect to each node of the hidden layer, and each node of the hidden layer may connect to each node of the output layer. In addition, the output of the hidden layer may be fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.
Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 10A:
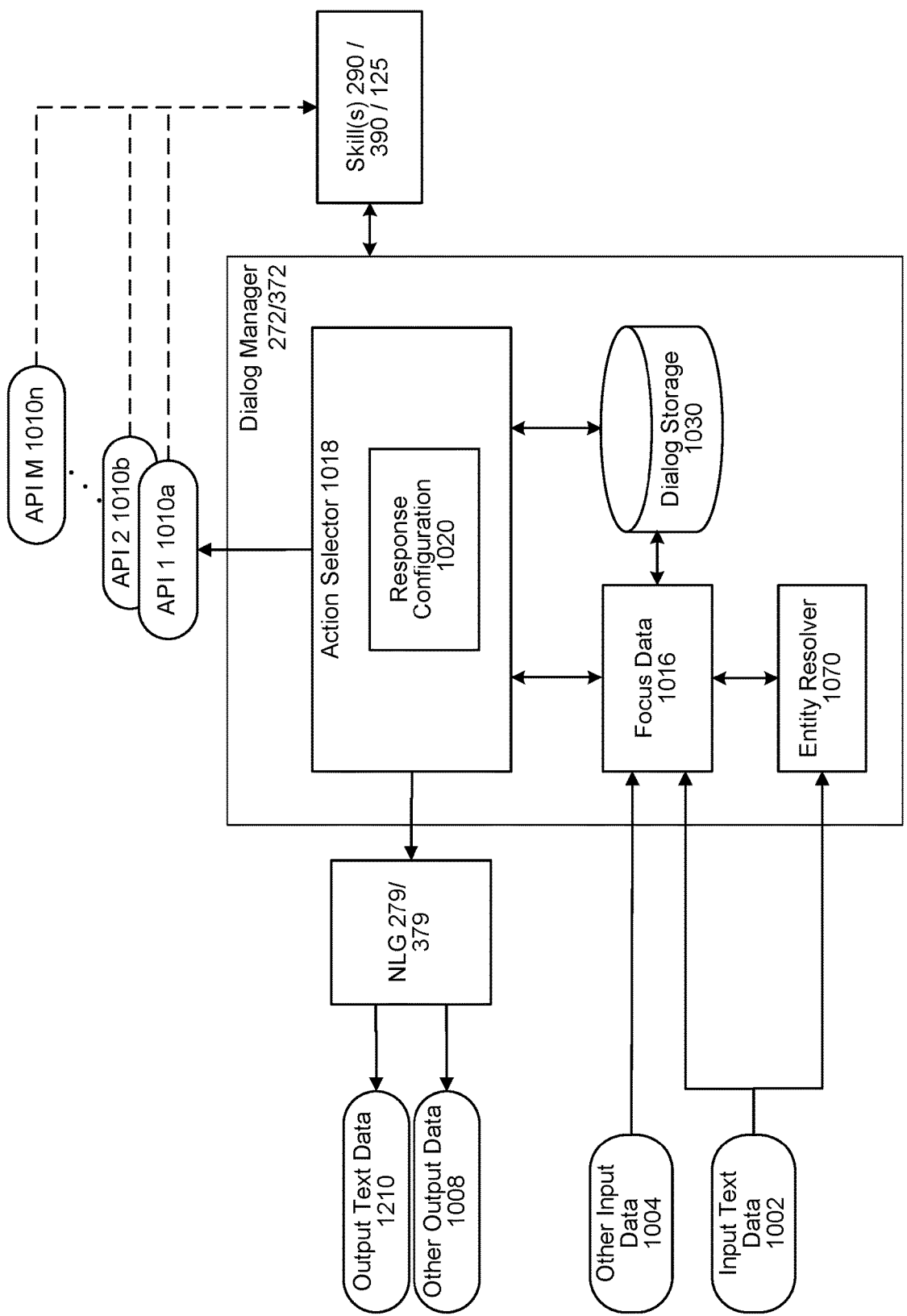
FIG. 10A is a conceptual diagram of components of a dialog manager component, according to embodiments of the present disclosure.

FIG. 10A illustrates operations to handle dialog management, according to embodiments of the present disclosure. One or more components shown in FIG. 10A may be part of the dialog manager 272372. For example, the dialog manager 272 may include the entity resolver 1070, the focus data component 1016 and the action selector 1018. The dialog manager 272 may work in concert with other language processing components, for example NLU 260, or may operate instead of such components in certain embodiments. Further, while illustrated as a separate component, dialog manager 272 may be included within another component such as language processing 292, NLU 260, or otherwise.

The system receives input text data 1002 which may be received, for example, by a device (e.g., 213) or from another component of the system (for example as ASR output data 610). The input text data 1002 may include text corresponding to a user input and metadata indicating further information about the text (such as an identity of the user for example determined by user recognition component 295), an emotional state of the user (for example determined by sentiment detection component 275, etc.). The input text data 1002 may be text representing words, instructions, markup language, speech, or gestures, or may be a vector or other representation of the same. The input text data 1002 may be generated by a user via a keyboard, touchscreen, microphone, camera, or other such input device. In other embodiments, the input text data 1002 is created using ASR, as described above, from audio data received from a user. For example, input text data 1002 may include ASR data 610. The system may further receive other input data 1004. For example, the other input data 1004 may correspond to a button press, visually detected gesture (for example detected by image processing component 240), or other input, such as image data as may interpreted by device 110, system 120, or other component (for example image processing component 240). Other input data 1004 may also include other data 620, context data 708, NLU results data 685, user profile data 271, user recognition data 895, or other data relative to the user's (or users') current or prior interactions with the system.

Using the input text data 1002 and/or other input data 1004, the system may determine and output text data 1210 and/or other output data 1008. The system may instead or in addition perform an action based on the input text data 1002 and/or other input data 1004, such as calling one or more APIs 1010.

An entity resolver 1070 may be used to determine that the input text data 1002 includes a representation of one or more entities, a process that may include named entity recognition (NER)—i.e., determining that the input text data 1002 includes the representation—and entity resolution (ER)—i.e., identifying a meaning or context of the entity, such as associating an identity of a person based on a recognized nickname. An entity may be a person, place, thing, idea, and/or goal; example entities include proper names, nicknames, business names, place names, and/or application names. The entity resolver 1070 may operate similarly to NER component 562 and/or entity resolution component 670 discussed herein with regard to NLU operations.

In some embodiments, a single entity resolver 1070 is used for more than one domain (i.e., a "cross-domain" entity resolver 1070). Each domain may correspond to one or more dialog models. One or more candidate domains corresponding to the input text data 1002 may be determined; entity resolvers 1070 corresponding to the candidate domains may be used to process the input text data 1002. The dialog focus data component 1016 may store the output entities from each candidate domain and may remove unselected entities when an API 1010 is selected or an action to be performed is determined.

The dialog focus data component 1016 may store state data (for example in dialog storage 1030) corresponding to dialog history data (including an intent(s), an entity(ies), etc. corresponding to a prior turn in the dialog), action history data, and/or other data. In some embodiments, the other components (e.g., the action selector 1018) do not store state data and instead query the dialog focus data 1016/dialog storage 1030 for the state data. The system may send some or all of the dialog focus data 1016 to other systems and/or may receive additional dialog focus data from other systems. In some embodiments, the other components (e.g., the action selector 1018) include a feature-extractor component to extract features from the dialog focus data 1016.

The dialog focus data 1016 may be graph-based data including a plurality of graph nodes; each graph node may correspond to an item of state data, such as an entity type, entity value, prior API call, and/or user data. The other components, such as the action selector 1018, may access all of the graph nodes of the dialog focus data 1016 or may access only a subset of the graph nodes of the dialog focus data 1016. The dialog focus data component 1016 may be any type of storage mechanism and may serve as long-term and/or short term memory for the system, thus enabling tracking of entities, ASR output, TTS output, and other features) at each turn through a dialog. In some embodiments, the dialog focus data 1016 is updated after each turn of dialog with updated dialog focus data; in other embodiments, the dialog focus data 1016 is updated after an end of a dialog is determined.

The entity resolver 1070 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skills 290 (e.g., a shopping skill, a music skill, a video skill, etc.), or may be organized in a variety of other ways.

The entity resolver 1070 may include a ranker component. The ranker component may assign a particular confidence score to each hypothesis input therein. The confidence score of a hypothesis may represent a confidence of the system in the processing performed with respect to the hypothesis. The confidence score of a particular hypothesis may be affected by whether the hypothesis has unfilled slots. For example, if a hypothesis associated with a first skill component includes slots that are all filled/resolved, that NLU hypothesis may be assigned a higher confidence score than another hypothesis including at least some slots that are unfilled/unresolved by the entity resolver 1070.

The focus data 1016 may store data relevant to a dialog. In various embodiments, the dialog focus data 1016 stores the input text data 1002, other input data 1004, data from the entity resolver 1070 and/or action data and dialog data from an action selector 1018. The dialog focus data 1016 may further include additional information, such as location data, user preference data, and environment data. In various embodiments, the dialog focus data 1016 uses an encoder to encode some or all of the received data into one or more feature vectors and a decoder to determine, based on the feature vectors, intent data corresponding to an intent of a user. The dialog focus data 1016 may further include state data that represents prior dialog, actions, or other prior user information or data.

The dialog focus data 1016 may also include data related to user(s) relevant to the dialog. For example, the focus data may include information related to how many users are participating in the dialog, the identity of each user, which user participated in which parts of the dialog (e.g., which user provided which input of the dialog), which users may be present in the room during the dialog but may not be active participants, The action selector 1018 determines an action to be performed in response to the user request, where the action may include calling an API to perform an action and/or presenting an output to the user. The action selector 1018 may include a trained model(s), and may process the dialog focus data 1016. If the action selector 1018 determines to invoke an API call, one or more APIs 1010 may be activated and a corresponding action carried out. If the action selector 1018 determines to present a prompt or other output data to the user, the NLG component 279 may be used to generate the output text data 1210 and/or other output data 1008. In either case, the action selection 1018 may update the dialog focus data 1016 based on the API call or the output presented to the user. The API call may be sent to a skill component (e.g., 290/390/125)

In some embodiments, the action selector 1018 may process data from the dialog storage 1030 to select one or more skills 290/skill system(s) 125 capable of responding to the user request, and present the selected skill to the user using the output text data 1210.

In some embodiments, the system(s) 120 may determine past interaction data, such as a satisfaction rating corresponding to skill(s) 290 and store it in the storage 1030. The satisfaction rating may be based on past interactions between users of the system(s) 120 and the skill. In some embodiments, the system(s) 120 may determine a user-specific satisfaction rating corresponding to the skill based on user-specific data, interaction-specific data and/or focus data 1016, such as, user profile data 271 associated with the specific user, location data, past user interactions with the system(s) 120, past user interactions with the skill 290, user preferences, device type for the device 110 that received the user request, device type for the device 110 that may output/respond to the user request, device capabilities, dialog state of previous turns in the dialog, and other data.

In some embodiments, users may provide feedback to the system(s) 120 or the skill system(s) 125 indicating the user's satisfaction in the service skill responding to the user request/performing an action in response to the user request. The feedback may be solicited by the system(s) 120 or the skill system(s) 125. In some cases, the feedback may be explicit feedback and may be received as a voice input, text input, gestures, or other types of input. In other cases, the feedback may be implicit feedback and may be determined by processing data related to the user interaction, such as, image data representing the user's facial expression, audio data (representing an utterance from the user) indicating a sentiment/emotion of the user, text data (representing the user input) indicating a sentiment of the user, other sounds/speech indicating the user's emotions/feelings/sentiment (e.g., "ugh" indicating frustration), and other types of data. Such feedback may also be considered as other input data 1004 for the response configuration component 1020.

The action selector 1018 may select a skill based on various other factors, including but not limited to, a user's age, user cohort (user affinities or other social organizations), location information (e.g., where the user input originated, where the user intends to travel to, etc.), skill location data, intent, intent type, time of day the user input is received, time of year the user input is received, and others.

The action selector 1018 may select a skill based on skill availability, for example, a reservations at a restaurant may indicate availability or no availability for a particular day. The system(s) 120/action selector 1018 may determine the number of diners at a restaurant or the number of takeout orders a restaurant is handling based on the number of user requests the system(s) 120 routed to the skill. In another example, the system(s) 120/action selector 1018 may determine that a number of user requests were routed to a first skill for a first location/geographic area (e.g., a city), and may determine to route the next/future user requests to another skill for that geographic area.

For a restaurant reservation, the action selector 1018 may select a skill based on a number of people in the user's party, since some restaurants may not make reservations for small parties less than a particular number. The action selector 1018 may select a skill based on person(s) other than the user that may be involved in the user request. For example, if the user says "Alexa, what should we do tomorrow?" the system(s) 120 may determine information relating to the other persons in the user's household to select a skill.

The action selector 1018 may select a skill based on the dialog state where the dialog state indicates multiple turns/attempts to recommend a skill/service provider, and the action selector 1018 may modify the search criteria (e.g., expand the zip code, expand the time frame, etc.) to select a skill.

The system may be configured in a way to dynamically adjust its response configurations based on context data or other data available. Such response configurations maybe adjusted during a dialog session with the user or at a time when there is no active dialog. The system response configuration data may reflect the system's attempts to provide an interaction with the user that the user will find most desirable based on user preferences and current conditions. The system response configuration data may be used to adjust the system's response to an input and/or adjust the system's timing and content of unsolicited interjections to the user, such as proactive outputs such as suggestions, information, and the like.

Figure 10B:
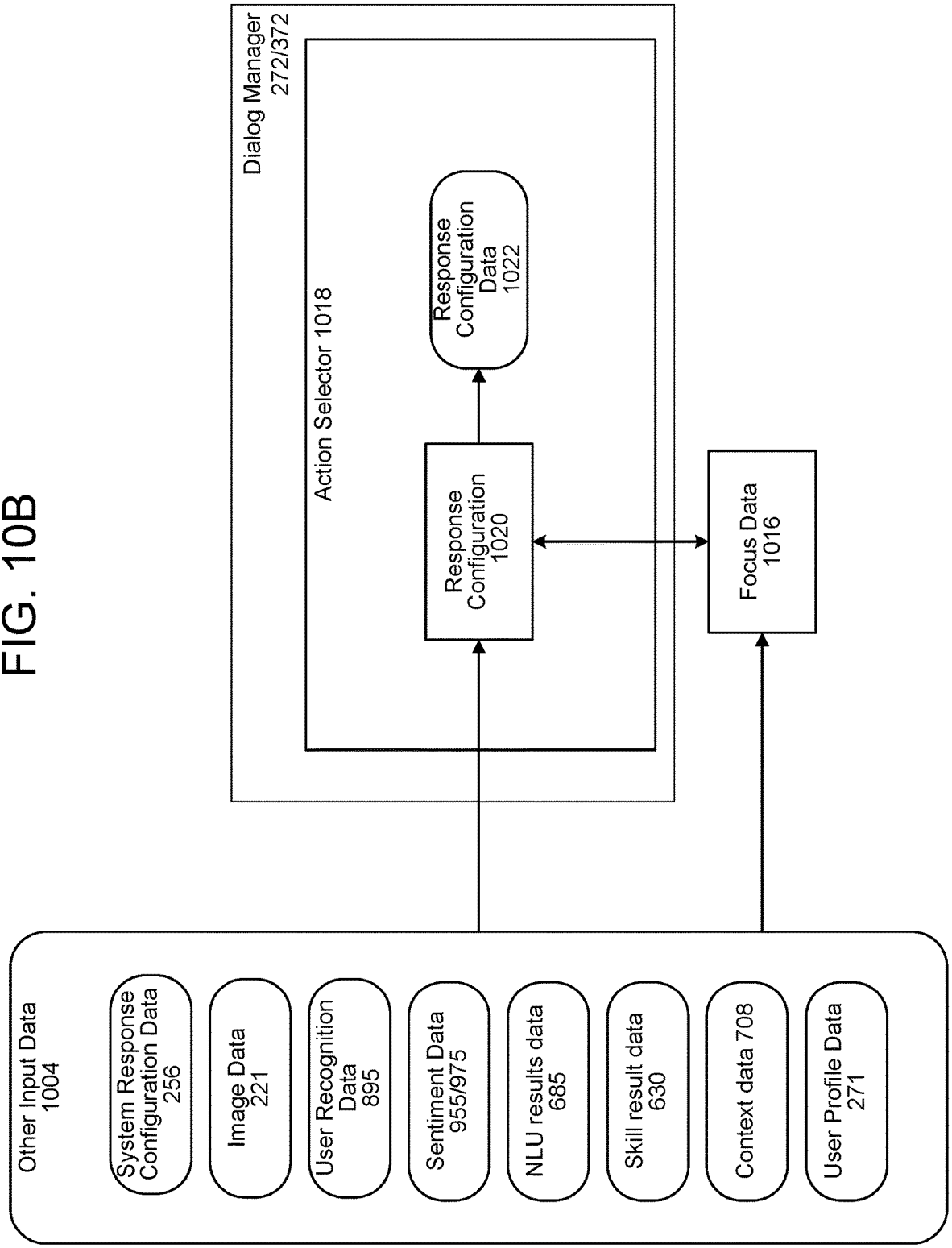
FIG. 10B is a conceptual diagram of components of a system response configuration component according to embodiments of the present disclosure.

The system may use a component such as response configuration component 1020, as illustrated in FIG. 10B, to manage the system response configuration data used by the system to determine output data. Although the response configuration component 1020 is illustrated as a component within the action selector 1018 of the dialog manager 272, it may be located at a different position within the system 100 architecture and indeed its operations may be performed by different components within the system 100.

The response configuration component 1020 may thus include a trained model such as a classifier or other component configured to process data relevant to how a system may create output data. As illustrated in FIG. 10B, the response configuration component 1020 may process many different types of data to make this determination. After processing the different data, the response configuration component 1020 may output system response configuration data 1022 which may be used by the system to determine output data. The system response configuration data 1022 may be a vector that may be analyzed by another component (such as NLG component 279/379, TTS component 280, or other component) to determine the form, timing, etc. of output data. The system response configuration data 1022 may be an encoded vector. The system response configuration data 1022 may be a data vector where a particular dimension/value of the vector corresponds to a perceived personality attribute of the system output such as those discussed here, for example, verbosity, tone, friendliness, or the like.

As shown in FIG. 10B, a variety of data may be considered by the response configuration component 1020. The response configuration component 1020 may also take as input other data 1004 shown in FIG. 10B and/or other data not illustrated (such as input text data 1002, an indication of what wakeword was used, etc.). Such data may be sent to the response configuration component 1020 in a number of ways. The data may be sent to the response configuration component 1020 directly (as shown in FIG. 10B), maybe sent through the focus data component 1016 (as shown in FIG. 10A), or may be encoded into a feature vector or other encoded form prior to being received by the response configuration component 1020. Such encoding may occur using one or more encoders (not shown) thus allowing a machine learning/trained model of the response configuration component 1020 to more easily process the input data for purposes of determining the form/timing/other setting of output data.

The response configuration component 1020 may input data representing a conversation/dialog as represented by the focus data 1016 and/or the dialog storage 1030 (not shown in FIG. 10B). For example the response configuration component 1020 may process state data related to the conversation, data indicating previous turns/inputs to the conversation whether by a user(s) or by the system, previous entities that have been mentioned as part of the conversation, previous sentiment data indicating sentiment of the participant(s) of the conversation at various turns of the conversation, a location of the conversation (which correspond to a location of the device 110 that is acting as the system participant of the conversation), time/day of the conversation, identity information related to the conversation participants, identity information related to other users in the environment of the device 110 that may not be participants to the conversation (e.g., whether children are present, etc.), history data relating to previous conversations (such as previous conversations between the participants in a present conversation), or other information.

The response configuration component 1020 may also input other types of input data 1004, for example data that may relate to the present user expression and/or data that may be otherwise relevant to the decision as to the determination of output data. For example, the response configuration component 1020 may also consider image data 221, for example raw image data captured by one or more cameras or image data as processed by image processing component 240/340 or otherwise. Such image data may be associated with a particular user expression as represented by audio data 211 and/or corresponding NLU results data 685. The response configuration component 1020 may also consider gesture data (not shown) which may indicate user gestures such as eye rolls, facial expressions, hand gestures, or other movements which may communicate an expression or intent by the user that should be considered by the system as part of the conversation expressed by the user. Examples include, but are not limited to, a head nod, head shake, thumbs up, eye roll, eyebrow raise, etc. The system may process image data indicating the user expression and may convert that image data into an indication of a gesture (for example by image processing component 240/340 or otherwise). An indication of the gesture may be processed by the dialog manager 272/372 and stored as part of the focus data 10 16 as part of the conversation. The response configuration component 1020 may also consider such gesture information (whether or not such a gesture is accompanied by audio data) to determine whether how the system should determine output data. For example, if a user performs a gesture that indicates confusion the system may repeat or rephrase a statement (whether that statement originated from the system or another user), if the image data/gesture indicates a particular user sentiment (e.g., as reflected in sentiment data 955/975), the system may adjust its response configuration data 1022 accordingly, etc.

The response configuration component 1020 may also consider user recognition data 895 to identify the user(s) participating in the conversation and specifically the user associated with the dialog the system is considering for purposes of determining system response configuration data 1022. The response configuration component 1020 may also consider user profile data 271 corresponding to the user(s) which may indicate a user preference for how the system should configure output data, how often interjections or other affirmative communications should occur with regard to a user(s), how the user(s) prefers system outputs to be phrased, wording choices, preferred audio characteristics, or the like. Such information may also be reflected in system response configuration data 256 which may indicate one or more system response profiles preferred by a user in different contexts/circumstances. The system response configuration data 256 may also include system response configuration data corresponding to the profile, which may be considered by the system when determining the ultimate system response configuration data 1022 to be used to determine the output data. For example, the response configuration component 1020 may output first system response configuration data 1022, but may take as input second system response configuration data which may correspond to the user profile, a particular system response profile, a default setting, or the like.

The system (e.g., the response configuration component 1020) may thus input one (or more) set(s) of system response configuration data and may consider that input system response configuration data (and all the other inputs) to determine output different system response configuration data 1022 to be used to prepare the output data. In one example, an input system response configuration data may include a first value corresponding to a first perceived personality attribute of a system response to user input (e.g., a potential natural language input). The first attribute may include, for example, verbosity, formality, tone, level of happiness, or the like (such as the perceived personality attributes discussed herein). The output system response configuration data 1022 may include a different value corresponding to the first attribute. That different value may be determined by the response configuration component 1020 based on other input data. Various other values, corresponding to other perceived personality attributes, may also be different between the output system response configuration data 1022 and the input system response configuration data (such as associated with user profile data 271, system response configuration data 256, etc.).

The response configuration component 1020 may also consider sentiment category data 955/975 to identify a sentiment associated with user(s) and specifically the sentiment associated with the particular dialog the system is considering for determining output data.

The response configuration component 1020 may also consider NLU results data 685 and/or skill result data 630 for the expression under consideration (or for previous turns of the conversation) to determine the system response configuration data 1022. For example, if the NLU results data 685/skill result data 630 indicates the expression involved a terse utterance that was easily understood by the system, that asked for a specific and precise piece of information and resulted in clearly actionable information such as an intent, entity, question, and/or other information for which the system (for example through a skill 290) is able to determine an appropriate response (e.g., skill result data 630), the response configuration component 1020 may indicate through system response configuration data 1022 that the output data should be appropriately terse to provide the desired information and no more. The response configuration component 1020 may be trained to process the NLU results data 685 with respect to data indicating the ongoing conversation to determine whether a subject matter of the user expression impacts the system response configuration data 1022. And if so, the response configuration component 1020 may operate accordingly.

The response configuration component 1020 may also consider audio data 211 (either raw or processed/encoded) which may indicate tone, speech/conversation speed/tempo, pauses, or other audio characteristics that may be relevant to the response configuration component 1020. The response configuration component 1020 may also consider time data relating to information such as time of day, the conversation speed/tempo, pause timing/length, typical user timing in responding to another user, or the like. The system may thus use the time data to determine how to determine output data using the system response configuration data 1022. The system may also (or alternatively) use such time data to determine the timing of an output, for example how soon after a user has finished speaking should the system wait before beginning presentation of output in response to the user expression.

The system may also use calendar information (e.g., date, day of the week, month, holiday information) to inform the determination of the system response configuration data 1022. For example, if the calendar information indicates that it is a user's birthday, the system may determine output data (and system response configuration data 1022) differently than if the calendar information indicates a more somber occasional/anniversary.

The response configuration component 1020 may also consider ASR results data 610 (either raw or processed/encoded) which may indicate certain words that may be relevant to the response configuration component 1020.

The response configuration component 1020 may also consider context data 708 and/or other data that may assist the system in determining whether to interject a response to a user expression. Although listed separately in FIG. 10B, other data such as sentiment data 955/975, user recognition data 895, time data, calendar data, device ID, device type, etc. may be considered context data in certain embodiments. Other context data 708 may include data from other devices/sensors available to the system which may impact the determination of system response configuration data 1022. For example, whether another device (or the device 110) in the environment of the user is performing some action (e.g., a loudspeaker playing music, a vacuum being operated, etc.) or other information about device state that may impact system output determination/the determination of system response configuration data 1022. The context data 708 may also include biometric data (e.g., biometric data 812) that may indicate a physical attribute of a user, such as exercise activity, heartrate, glucose level, blood alcohol level, fatigue, etc. The context data 708 may also include information from a wearable device, mobile device, etc. associated with a user.

The system response configuration data 256/1022 may in the form of a data vector representing the system response configuration data/perceived personality attributes of the system. In certain embodiments the system may use a first data vector representing context data (e.g., 708, sentiment data, time data, or other input data 1004, etc.) and a second data vector representing system response configuration data 256 to determine a third data vector representing system response configuration data 1022. The system may determine the third data vector by performing some operation using the first data vector and the second data vector (e.g., by processing them both using a machine learning or other component). And/or the system may weight the first data vector based on the second data vector to determine the third data vector. The system may also perform other operations to determine the third data vector using the first data vector and second data vector.

The system response configuration data 256/1022 may be sent to one or more other components for determining output data. For example, the system response configuration data 256/1022 may be sent to NLG component 279/379 to determine the words of a particular output response. The system response configuration data 256/1022 may also be sent to TTS component 280/380 to determine the audio data representing synthesized speech of an output. The system response configuration data 256/1022 may also be used by the action selector 1018/dialog manager 272/372 to determine what action to take, what device to send an output to, the content of the output, the form of the output (e.g., audio, visual, haptic, etc.). For example, if the system response configuration data 256/1022 indicates that a device 110 that received a user input is involved in another activity, the action selector 1018 may indicate that output data should be sent to a different device. Further, if the system response configuration data 256/1022 indicates that a privacy mode is active (or a privacy attribute has a high value) the system may determine that instead of sending output data corresponding to an audio message to a tabletop speech detection device 110a the system should send output data in the form of a haptic and/or visual acknowledgement to a smart watch 110c.

As illustrated in FIG. 10B, determination of the system response configuration data 1022 may depend on the NLU results data 685 and/or skill results data 630. Thus the system may determine the system response configuration data 1022 to match the content of the response. For example, if the response substantively calls for output that matches a certain output style (e.g., breaking news, a score update, an emergency notification) the system may determine the system response configuration data 1022 that matches the desired style.

The response configuration component 1020 may update the system response configuration data 1022 as configured by the system. For example, the system may update the system response configuration data 1022 every certain time interval (e.g., 5 seconds, 30 seconds, 5 minutes, 2 hours, etc.). The system may also update the system response configuration data 1022 after every dialog turn. The system may also update the system response configuration data 1022 as new input data is received. As time progresses, the weight given to certain data available to the response configuration component 1020 may decay. Thus, depending on the type of data, the response configuration component 1020 may weight older data less than newer data when determining system response configuration data 1022.

The response configuration component 1020 may be configured to incorporate prior system response configuration data (for example from previous turns in a dialog) to smooth or otherwise adjust the system response configuration data 1022 to avoid significant differences in the presentation of output data by the system (for example during a single dialog). To do so the response configuration component 1020 may apply a moving average of system response configuration data to avoid large attribute value swings (which may present as the system exhibiting very different output qualities) between outputs of a dialog turns.

The response configuration component 1020 may also be configured to perform processing that can handle multiple system response configuration profiles that may apply to a particular situation. For example, if two users are present in a room, two different system response configuration profiles/sets of system response configuration data may apply to a particular system output. The response configuration component 1020 may prioritize one system response configuration profile over another based on the respective user corresponding to the particular profile, for example, prioritizing a parent's system response configuration profile over a child's system response configuration profile. The response configuration component 1020 may prioritize one system response configuration profile over another based on the device ID, for example, prioritizing a child's system response configuration profile over a parent's system response configuration profile for child device.

The response configuration component 1020 may also combine system response configuration data of two different users to determine system response configuration data 1022. For example if a first user and second user are present, the system may take a first value corresponding to the first user's system response configuration data and a second value corresponding to the second user's system response configuration data (where the first value and second value may correspond to the same perceived system personality attribute) and may use the first value and second value determine a third value for that perceived personality attribute to be used in the system response configuration data 1022. For example, the system may average the first value and second value.

The response configuration component 1020 may weight the profiles based on an authority level of the users, for example, weighting the values of a parent's system response configuration data by 75% compared to a weighting the values of a child's system response configuration data by 25% and then combining the weighted values to determine system response configuration data 1022.

The system may also select one value from one user's system response configuration data and another from the other user's system response configuration data, where the selection may be based on what response attributes are most likely to create a desirable user experience for all present users.

The response configuration component 1020 may prioritize one system response configuration profile over another based on the responsive content, for example using a parent's system response configuration profile to determine system response configuration data 1022 for outputting news content.

FIGS. 11A-11B illustrate a signal flow for determining output data based on response settings data according to embodiments of the present disclosure. A device 110 may send (1102) audio data (or other data representing a user input) to a language processing component 292. The language processing component 292 may perform (1104) processing (such as ASR, NLU, SLU, or other speech/natural language processing) to determine NLU results data. The language processing component 292 may send (1106) the NLU results data to a skill 290. The skill 290 may determine (1108) first output data responsive to the user input. The skill 290 may send (1109) the first output data (e.g., skill results data 630) to a dialog manager 272. The dialog manager 272, for example using response configuration component 1020, may determine (1110) an active system response profile, which may correspond to system response configuration data 256. The dialog manager 272 may also receive (1112) data for determining updated system response configuration data. Such data may include, for example, focus data 1016, other input data 1004, and/or other data that the system may use for determining system response configuration data for purposes of determining output data. The system, e.g., the response configuration component 1020 may then determine (1114) updated system response configuration data 1022 to be used to prepare output data to be returned to a user in response to the user input.

As shown in FIG. 11B, the response configuration component 1020 may then send (1116) the system response configuration data 1022 to the dialog manager 272/372, to the language output component 293, or to other components (not illustrated) that may use the system response configuration data 1022. The dialog manager 272 may also send (1118) the interim output data to the language output component 293. The interim output data may include the first output data/skill result data 630 provided by skill 290. Alternatively, or in addition, the interim output data may be different from the first output data/skill result data 630, for example if the dialog manager 272 or other system component alters the first output data/skill result data 630 (for example altering the first output data/skill result data 630 based at least in part on the system response configuration data 1022) to create the interim output data. The language output component 293 may then determine (1120) updated (e.g., second) output data using the first output data and the system response configuration data 1022. The second/updated output data may then be sent (1122) to the device 110 for presentation to the user.

In sending data to the language output component 293 the dialog manager 272 may send the raw system response configuration data 1022 and/or the dialog manager 272 may itself adjust the interim output data (e.g., the first output data/skill result data 630 provided by skill 290) in some manner as reflected by the system response configuration data 1022 so that the language output component 293 may prepare output data accordingly. For example, the dialog manager 272 may send a data tag (e.g., a Speech Synthesis Markup Language (SSML) data tag) or other metadata along with the interim output data so the language output component 293 will create the ultimate output data according to the specific desired output as indicated by the system response configuration data 1022. Thus the dialog manager 272 (or other component) may interpret the system response configuration data 1022 so the ultimate data sent to the language output component 293 (or other component) is in the appropriate form for ultimate determination of the desired output data.

Although determining the second/updated output data is illustrated in FIG. 11B as being performed by the language output component 293, it may also be performed by other component(s) such as the dialog manager 272 or other component.

Determining the second/updated output data may also take different forms. For example, determining the second/updated output data may include changing a word content of the first/initial output data. Thus, the first/initial output data may include a first plurality of words but the second/updated output data includes a different, second plurality of words which are selected (for example by NLG component 279) based at least in part on the system response configuration data 1022. For example, the system response configuration data 1022 may represent a particular verbosity value that corresponds with the second plurality of words.

In determining the second plurality of words to use, the system may use one or more templates corresponding to the verbosity/system response configuration data 1022. For example, for a particular verbosity value the system may use one template for a response but for another verbosity value the system may use a different template for a response. In the example of outputting weather information the system may use the below terse template or the below verbose template, or any other variety of template, depending on the system response configuration data 1022.

TemplateA (Verbosity:0.2): <weatherdata>|Temperature today is a high of <temperaturehigh> and a low of <temperaturelow>.

TemplateB (Verbosity:0.6): <weatherdata>|Good <timeofday>, the weather today is <weathercharacteristic>, with a high of <temperaturehigh> and a low of <temperaturelow> and <precipitationdata>. Tomorrow will be <weathercharacteristic>, with a high of <temperaturehigh> and a low of <temperaturelow> and <precipitationdata>.

In another example, determining the second/updated output data may include changing an audio quality of the first/initial output data. Thus, the first/initial output data may include data indicating a particular audio quality but the second/updated output data includes a different audio quality as determined (for example by TTS component 280) based at least in part on the system response configuration data 1022. For example, the system response configuration data 1022 may represent a particular audio quality that corresponds with the different audio quality.

In another example, determining the second/updated output data may include changing a form of output of the first/initial output data. Thus, the first/initial output data may indicate data should be output in a particular form (e.g., audio, haptic, visual) but the second/updated output data is determined (for example by action selector 1018) to be in a different form (e.g., audio, haptic, visual) based at least in part on the system response configuration data 1022. For example, the system response configuration data 1022 may represent a desired output form.

In another example, determining the second/updated output data may include changing an output device from that indicated in the first/initial output data. Thus, the first/initial output data may indicate a first device to be used for output but the second/updated output data is determined (for example by action selector 1018) to be sent to a different device based at least in part on the system response configuration data 1022. For example, a directive (e.g., initial skill results data output by skill 290) may correspond to an instruction for a device 110a to play an audio response (e.g., a beep). The action selector 1018, however, may determine from the system response configuration data 1022 that the particular device 110a is engaged in other audio output (e.g., music) that should not be interrupted. Thus the action selector 1018 changes the directive to correspond to an instruction for a different device 110c to output an audio (and/or haptic) response.

In another example, determining the second/updated output data may include changing a directive/value indicated in the first/initial output data. Thus, the first/initial output data may indicate a first directive/value to be sent to a device but the second/updated output data is determined (for example by action selector 1018) to be a different/value to be sent. For example, a directive (e.g., initial skill results data output by skill 290) may correspond to an instruction to set a lighting output value to 3 in response to a user command to "lower the lights." The action selector 1018, however, may determine from the system response configuration data 1022 that the user is actually in a situation where the lighting should not be reduced too far (e.g., the user is working) so the action selector 1018 changes the directive to correspond to an instruction to set a lighting output value to 5.

In another example, the system may change an attribute of output data (e.g., changing an image from color to black-and-white, or vice versa) based on the system response configuration data 1022.

In another example, the system may simple cancel a planned output entirely and may determine that the initial output data should not result in an output to a device and thus cancel the output.

Perceived personality attributes may correspond to output settings such as number of and arrangement of words to include in an output, speed of synthesized speech, speech qualities of synthesized speech (e.g., how vocal characteristics such as prosody, tempo, pitch, accent etc. and how they present in a system output), visual output settings, timing of output, and/or other output qualities. Thus the system may set or adjust a particular output setting based at least in part on the system response configuration data 1022.

The system may also use from the system response configuration data 1022 to perform actions that may not necessarily be considered altering output data. For example, the system response configuration data 1022 may indicate a party mode so the system may instruct a device (such as an autonomously mobile device, robot vacuum, or the like) to move freely in an environment (being sure to avoid collisions). Or the system may instruct a device (e.g., device 110*f*) to move a component (e.g., rotate a screen). Or the system may instruct another device to perform an action even if the initial output data does not call for such an action (e.g., instruct a light to flash on and off to get a user's attention for an emergency announcement).

Figure 12:
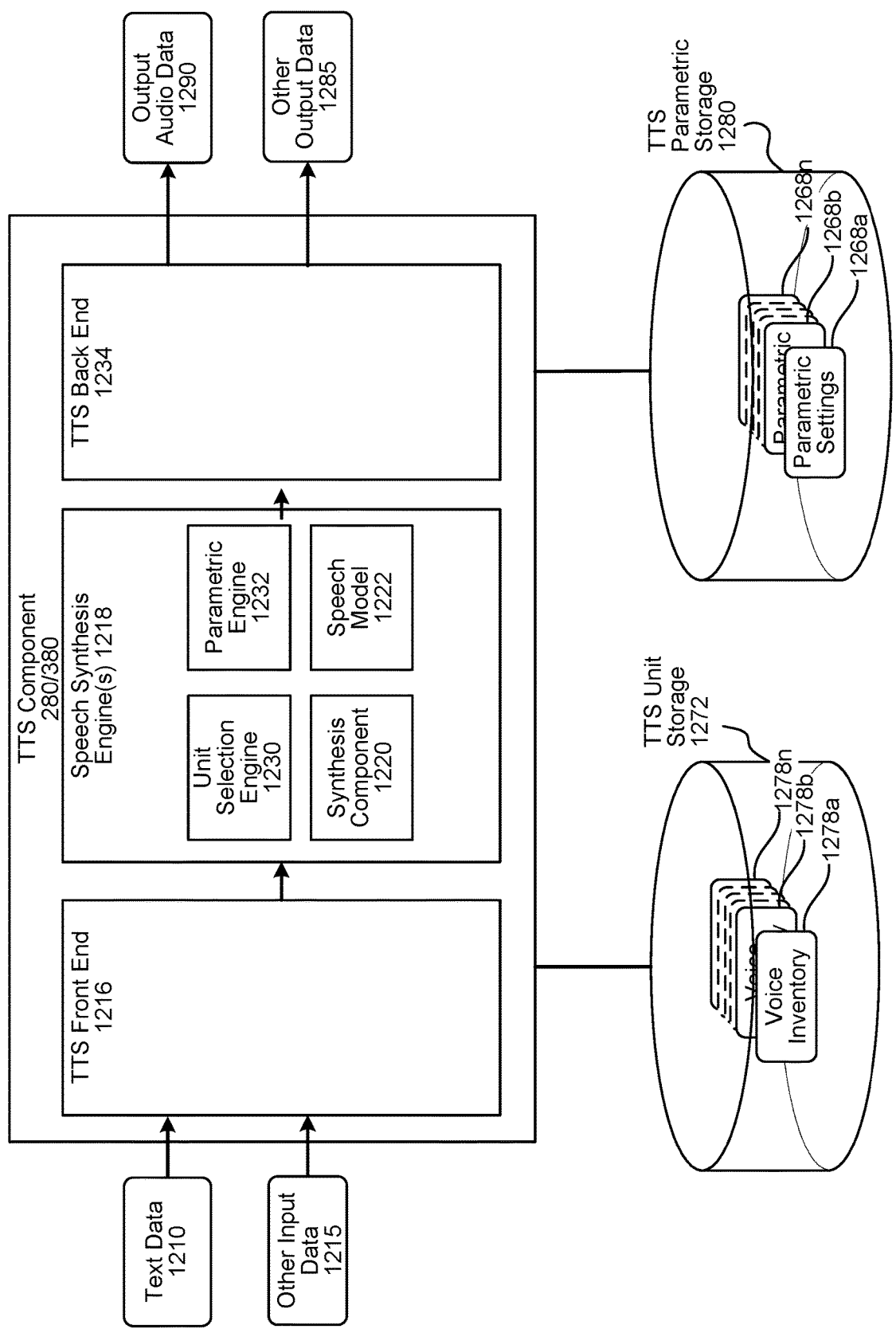
FIG. 12 is a conceptual diagram of text-to-speech components according to embodiments of the present disclosure.

Components of a system that may be used to perform unit selection, parametric TTS processing, and/or model-based audio synthesis are shown in FIG. 12. As shown in FIG. 12, the TTS component/processor 280/380 may include a TTS front end 1216, a speech synthesis engine 1218, TTS unit storage 1272, TTS parametric storage 1280, and a TTS back end 1234. The TTS unit storage 1272 may include, among other things, voice inventories 1278*a*-1278*n* that may include pre-recorded audio segments (called units) to be used by the unit selection engine 1230 when performing unit selection synthesis as described below. The TTS parametric storage 1280 may include, among other things, parametric settings 1268*a*-1268*n* that may be used by the parametric synthesis engine 1232 when performing parametric synthesis as described below. A particular set of parametric settings 1268 may correspond to a particular voice profile (e.g., whispered speech, excited speech, etc.).

In various embodiments of the present disclosure, model-based synthesis of audio data may be performed using by a speech model 1222 and a TTS front end 1216. The TTS front end 1216 may be the same as front ends used in traditional unit selection or parametric systems. In other embodiments, some or all of the components of the TTS front end 1216 are based on other trained models. The present disclosure is not, however, limited to any particular type of TTS front end 1216. The speech model 1222 may be used to synthesize speech without requiring the TTS unit storage 1272 or the TTS parametric storage 1280, as described in greater detail below.

TTS component receives text data 1210. Although the text data 1210 in FIG. 12 is input into the TTS component 280, it may be output by other component(s) (such as a skill 290, NLU component 260, NLG component 279 or other component) and may be intended for output by the system. Thus in certain instances text data 1210 may be referred to as "output text data." Further, the data 1210 may not necessarily be text, but may include other data (such as symbols, code, other data, etc.) that may reference text (such as an indicator of a word) that is to be synthesized. Thus data 1210 may come in a variety of forms. The TTS front end 1216 transforms the data 1210 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1218. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1210, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1216 may also process other input data 1215. The other input data 1215 may include system response configuration data 256/1022 which the TTS component 280 may use to synthesize speech. For example, the TTS component 280 may take the system response configuration data and process it using the TTS front end 1216 to convert the system response configuration data into data usable by the speech synthesis engine 1218 to actually determine audio data that corresponds to the system response configuration data. The audio data may be created to match the attribute values indicated by the system response configuration data, thus creating output audio with the desired level of friendliness, formality, etc. as indicated by the system response configuration data. The TTS component 280 may also be configured to process system response configuration data that comes in the form of encoded data that may implicitly rather than explicitly correspond to a desired system response attribute. The TTS component 280 may process such data accordingly.

The other input data 1215 may also include other data, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1210 and/or the text for a TTS request may be accompanied by separate metadata indicating what text should be whispered (or have some other indicated audio characteristic). The speech synthesis engine 1218 may compare the annotated phonetic units models and information stored in the TTS unit storage 1272 and/or TTS parametric storage 1280 for converting the input text into speech. The TTS front end 1216 and speech synthesis engine 1218 may include their own controller(s)/processor(s) and memory or they may use the controller/processor and memory of the server 120, device 110, or other device, for example. Similarly, the instructions for operating the TTS front end 1216 and speech synthesis engine 1218 may be located within the TTS component 280, within the memory and/or storage of the server 120, device 110, or within an external device.

Text data 1210 input into the TTS component 280 may be sent to the TTS front end 1216 for processing. The front end 1216 may include components for performing text normalization, linguistic analysis, linguistic prosody generation, or other such components. During text normalization, the TTS front end 1216 may first process the text input and generate standard text, converting such things as numbers, abbreviations (such as Apt., St., etc.), symbols ($, %, etc.) into the equivalent of written out words.

During linguistic analysis, the TTS front end 1216 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 1272. The linguistic analysis performed by the TTS front end 1216 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 1216 may then perform linguistic prosody generation where the phonetic units are annotated with desired prosodic characteristics, also called acoustic features, which indicate how the desired phonetic units are to be pronounced in the eventual output speech. During this stage the TTS front end 1216 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1216, which may be referred to as a symbolic linguistic representation, may include a sequence of phonetic units annotated with prosodic characteristics. This symbolic linguistic representation may be sent to the speech synthesis engine 1218, which may also be known as a synthesizer, for conversion into an audio waveform of speech for output to an audio output device and eventually to a user. The speech synthesis engine 1218 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1218 may perform speech synthesis using one or more different methods. In one method of synthesis called unit selection, described further below, a unit selection engine 1230 matches the symbolic linguistic representation created by the TTS front end 1216 against a database of recorded speech, such as a database (e.g., TTS unit storage 1272) storing information regarding one or more voice corpuses (e.g., voice inventories 1278a-n). Each voice inventory may correspond to various segments of audio that was recorded by a speaking human, such as a voice actor, where the segments are stored in an individual inventory 1278 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1230 may then use the information about each unit to select units to be joined together to form the speech output.

The unit selection engine 1230 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1220) to form output audio data 1290 representing synthesized speech. Using all the information in the unit database, a unit selection engine 1230 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1232, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1220) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS unit storage 1272 based on feedback of the results of TTS processing, thus enabling the TTS component 280 to improve speech synthesis.

The TTS unit storage 1272 may be customized for an individual user based on his/her individualized desired speech output. In particular, the speech unit stored in a unit database may be taken from input audio data of the user speaking. For example, to create the customized speech output of the system, the system may be configured with multiple voice inventories 1278a-1278n, where each unit database is configured with a different "voice" to match desired speech qualities. Such voice inventories may also be linked to user accounts. The voice selected by the TTS component 280 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1278 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1268) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1230 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1230. As part of unit selection, the unit selection engine 1230 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1272 or in another storage component. For example, different unit selection databases may be stored in TTS unit storage 1272. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1218 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 1232 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1216.

The parametric synthesis engine 1232 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1218, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1232 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1232 may lead to a number of potential audio output sequences. Based on the acoustic model and other potential models, the potential audio output sequences may be scored according to a confidence level of the parametric synthesis engine 1232. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1268, which may represent acoustic settings matching a particular parametric "voice", may be used by the synthesis component 1220 to ultimately create the output audio data 1290.

When performing unit selection, after a unit is selected by the unit selection engine 1230, the audio data corresponding to the unit may be passed to the synthesis component 1220. The synthesis component 1220 may then process the audio data of the unit to create modified audio data where the modified audio data reflects a desired audio quality. The synthesis component 1220 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 280. For each unit that corresponds to the selected portion, the synthesis component 1220 may process the audio data for that unit to create a modified unit audio data. The modified unit audio data may then be concatenated to form the output audio data 1290. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 280. In that case, other output data 1285 may be output along with the output audio data 1290 so that an ultimate playback device (e.g., device 110) receives instructions for playback that can assist in creating the desired output audio. Thus, the other output data 1285 may include instructions or other data indicating playback device settings (such as volume, playback rate, etc.) or other data indicating how output audio data including synthesized speech should be output. For example, for whispered speech, the output audio data 1290 may include other output data 1285 that may include a prosody tag or other indicator that instructs the device 110 to slow down the playback of the output audio data 1290, thus making the ultimate audio sound more like whispered speech, which is typically slower than normal speech. In another example, the other output data 1285 may include a volume tag that instructs the device 110 to output the speech at a volume level less than a current volume setting of the device 110, thus improving the quiet whisper effect.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 13:
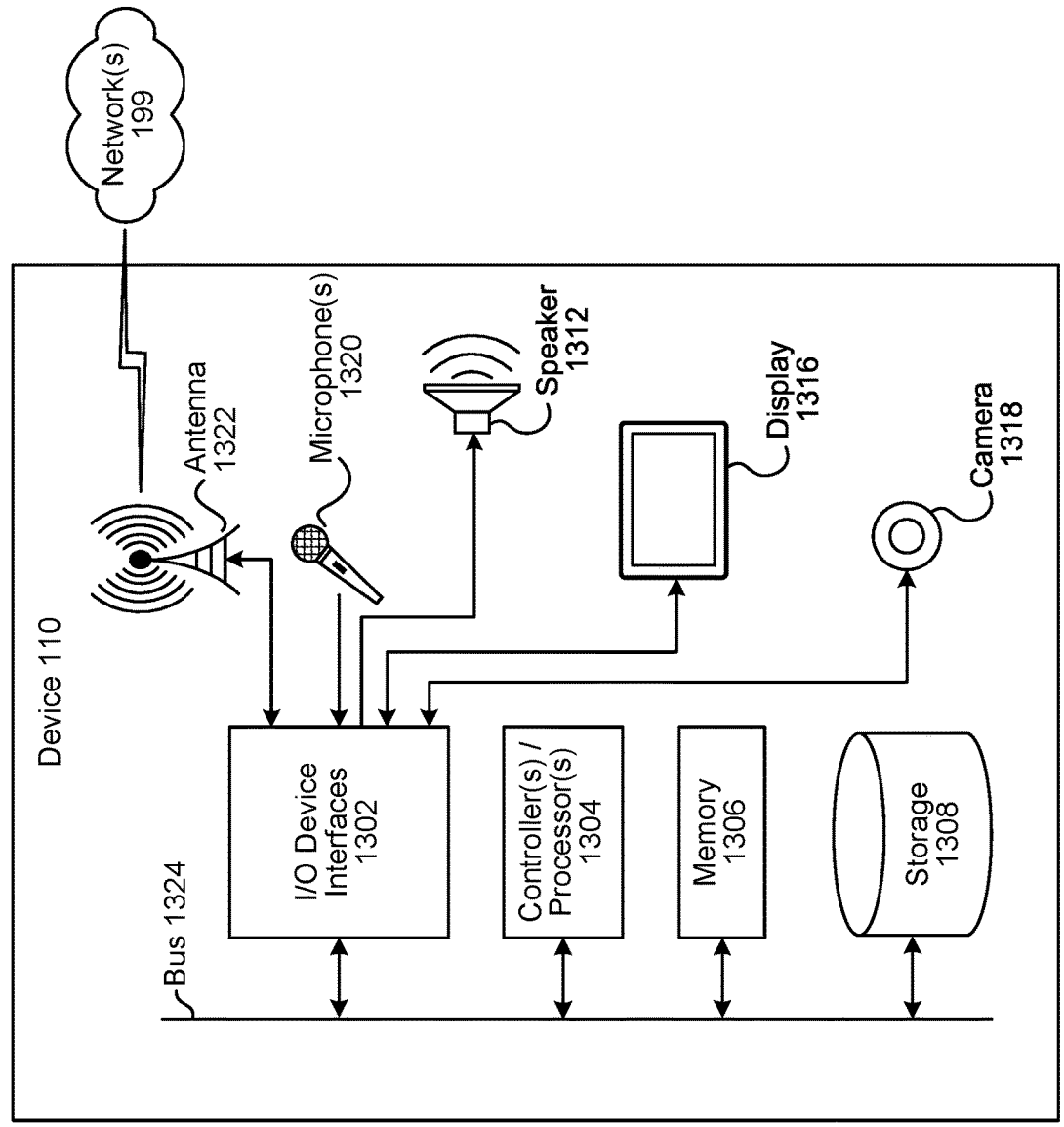
FIG. 13 is a block diagram conceptually illustrating example components of a device, according to embodiments of the present disclosure.
Figure 14:
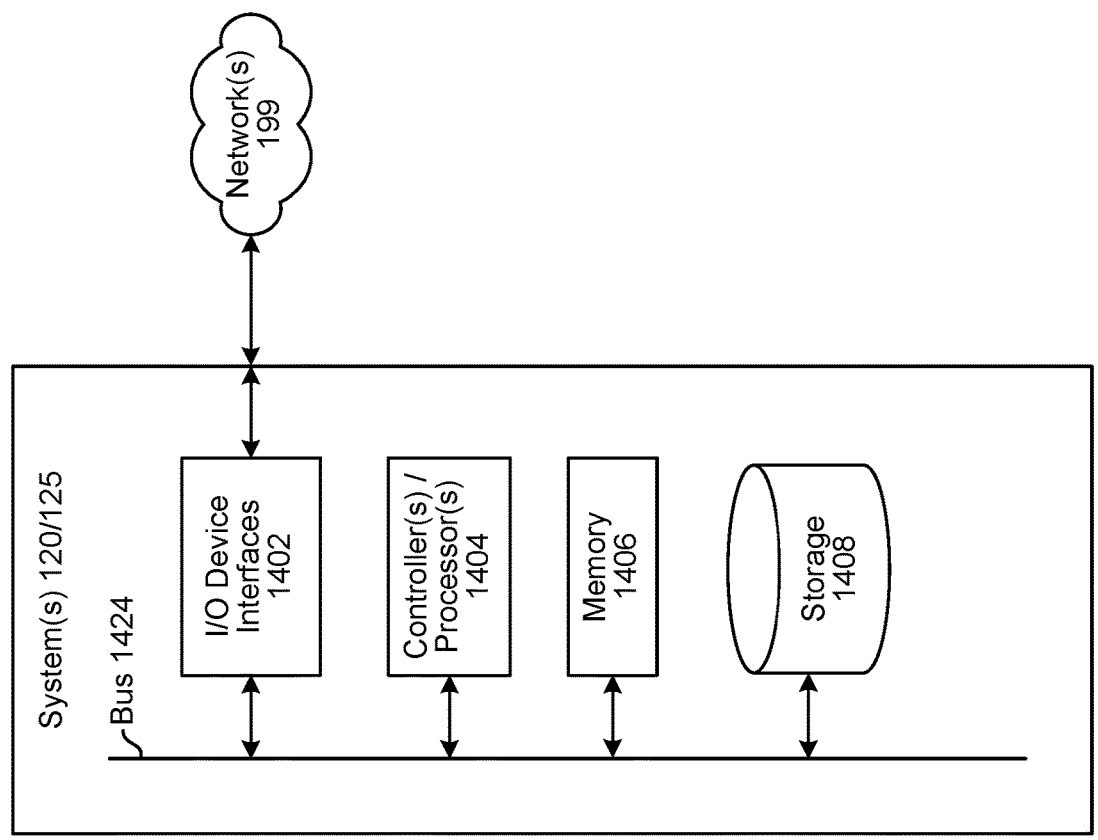
FIG. 14 is a block diagram conceptually illustrating example components of a system, according to embodiments of the present disclosure.

FIG. 13 is a block diagram conceptually illustrating a device 110 that may be used with the system. FIG. 14 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/125) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1302/1402).

Computer instructions for operating each device (110/120/125) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/125) includes input/output device interfaces (1302/1402). A variety of components may be connected through the input/output device interfaces (1302/1402), as will be discussed further below. Additionally, each device (110/120/125) may include an address/data bus (1324/1424) for conveying data among components of the respective device. Each component within a device (110/120/125) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1322, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1302/1402), processor(s) (1304/1404), memory (1306/1406), and/or storage (1308/1408) of the device(s) 110, natural language command processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

Figure 15:
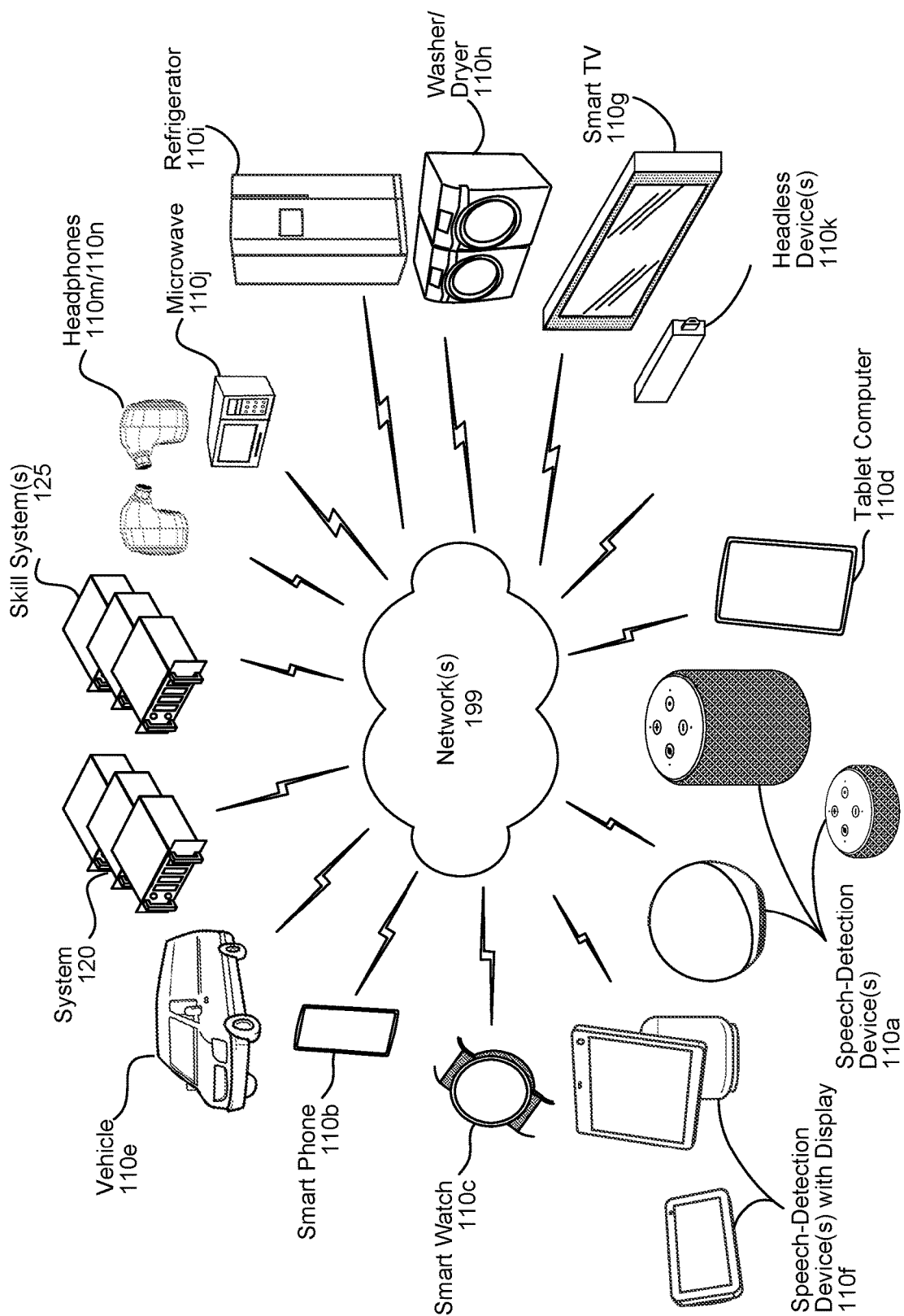
FIG. 15 illustrates an example of a computer network for use with the overall system, according to embodiments of the present disclosure.

As illustrated in FIG. 15, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, and/or headless device(s) 110k (e.g., a device such as a FireTV stick, Echo Auto or the like) may be connected to the network(s) 199 through a wireless service provider, over a WiFi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first device associated with a user profile, audio data representing an utterance;
   performing speech processing using the audio data to determine natural language understanding (NLU) results data;
   sending the NLU results data to a first skill component;
   receiving, from the first skill component, first results data;
   determining a first system response configuration profile associated with the user profile, the first system response configuration profile corresponding to a plurality of perceived personality attributes of a system;
   determining first data representing a state of a user corresponding to the utterance;
   processing the first data and the first system response configuration profile to determine first system response configuration data;
   determining, based at least in part on the first results data and the first system response configuration data, second results data different from the first results data; and
   causing the first device to present output data corresponding to the second results data.

2. The computer-implemented method of claim 1, further comprising:
   determining second system response configuration data associated with the first system response configuration profile, the second system response configuration data different from the first system response configuration data;
   determining a first data vector representing the first data;
   determining a second data vector representing the second system response configuration data;
   using the first data vector, the second data vector, and a first component to determine a third data vector representing the first system response configuration data; and
   using the third data vector to determine the second results data.

3. The computer-implemented method of claim 1, wherein the first results data represents a first plurality of words and the method further comprises:

processing the first results data and the first system response configuration data using a natural language generation component to determine a second plurality of words different from the first plurality of words; and
including the second plurality of words in the second results data.

4. The computer-implemented method of claim 1, further comprising, prior to receiving the audio data:
determining dialog data corresponding to a plurality of prior utterances associated with the user profile; and
using the dialog data to select the first system response configuration profile from a plurality of system response configuration profiles including the first system response configuration profile associated with second system response configuration data and a second system response configuration profile associated with third system response configuration data.

5. A computer-implemented method comprising:
receiving input data corresponding to a natural language input;
determining first data representing a state of a user corresponding to the natural language input;
determining, using at least the first data, first system response configuration data corresponding to the natural language input, the first system response configuration data representing at least one perceived personality attribute of a system;
processing the input data to determine first output data responsive to the natural language input;
determining, based at least in part on the first output data and the first system response configuration data, second output data different from the first output data; and
causing the second output data to be presented in response to the natural language input.

6. The computer-implemented method of claim 5, further comprising:
determining a user profile associated with the input data;
determining a first system response configuration profile associated with the user profile, the first system response configuration profile associated with second system response configuration data different from the first system response configuration data;
receiving context data corresponding to the natural language input; and
processing the second system response configuration data and the context data to determine the first system response configuration data.

7. The computer-implemented method of claim 6, wherein:
the second system response configuration data includes a first value corresponding to the at least one perceived personality attribute; and
the method further comprises:
processing the context data and the first value to determine a second value corresponding to the at least one perceived personality attribute, and
including the second value in the first system response configuration data.

8. The computer-implemented method of claim 6, wherein:
the context data comprises sentiment data corresponding to the natural language input; and
the method further comprises:
processing at least one of audio data or image data corresponding to the natural language input to determine the sentiment data.

9. The computer-implemented method of claim 6, further comprising:
determining dialog data corresponding to a plurality of prior utterances associated with the user profile; and
using the dialog data to select the first system response configuration profile from a plurality of system response configuration profiles including the first system response configuration profile and a second system response configuration profile associated with third system response configuration data.

10. The computer-implemented method of claim 5, wherein:
the first output data represents a first plurality of words; and
the second output data represents a second plurality of words different from the first plurality of words.

11. The computer-implemented method of claim 5, wherein determining the second output data comprises:
processing the first output data and the first system response configuration data using a natural language generation component to determine text data responsive to the natural language input; and
using the text data to determine the second output data.

12. The computer-implemented method of claim 5, wherein determining the second output data comprises:
processing the first output data and the first system response configuration data using a text-to-speech component to determine audio data responsive to the natural language input; and
using the audio data to determine the second output data.

13. The computer-implemented method of claim 5, further comprising:
processing the input data to determine natural language understanding (NLU) results data;
sending the NLU results data to a first skill component;
receiving, from the first skill component, the first output data comprising a first portion and a second portion; and
based at least in part on the first system response configuration data, including in the second output data the first portion and not the second portion.

14. The computer-implemented method of claim 5, wherein determining the second output data comprises:
using a dialog management component, the first output data, and the first system response configuration data to determine the second output data.

15. The computer-implemented method of claim 5, wherein determining the first system response configuration data is based at least in part on a user profile associated with the input data.

16. A computing system comprising:
at least one processor; and
at least one memory comprising instructions that, when executed by the at least one processor, cause the computing system to:
receive input data corresponding to a natural language input;
determine first data representing a state of a user corresponding to the natural language input;
determine, using at least the first data, first system response configuration data corresponding to the natural language input, the first system response configuration data representing at least one perceived personality attribute of a system;
process the input data to determine first output data responsive to the natural language input;

determine, based at least in part on the first output data and the first system response configuration data, second output data different from the first output data; and cause the second output data to be presented in response to the natural language input.

17. The computing system of claim 16, wherein the at least one memory further comprises instructions that, when executed by the at least one processor, further cause the computing system to:

determine a user profile associated with the input data;

determine a first system response configuration profile associated with the user profile, the first system response configuration profile associated with second system response configuration data different from the first system response configuration data;

receive context data corresponding to the natural language input; and process the second system response configuration data and the context data to determine the first system response configuration data.

18. The computing system of claim 17, wherein:

the second system response configuration data includes a first value corresponding to the at least one perceived personality attribute; and the at least one memory further comprises instructions that, when executed by the at least one processor, further cause the computing system to:

process the context data and the first value to determine a second value corresponding to the at least one perceived personality attribute, and include the second value in the first system response configuration data.

19. The computing system of claim 17, wherein:

the context data comprises sentiment data corresponding to the natural language input; and the at least one memory further comprises instructions that, when executed by the at least one processor, further cause the computing system to:

process at least one of audio data or image data corresponding to the natural language input to determine the sentiment data.

20. The computing system of claim 16, wherein the at least one memory further comprises instructions that, when executed by the at least one processor, further cause the computing system to:

process the input data to determine natural language understanding (NLU) results data;

send the NLU results data to a first skill component;

receive, from the first skill component, the first output data comprising a first portion and a second portion; and based at least in part on the first system response configuration data, include in the second output data the first portion and not the second portion.

* * * * *